(12) United States Patent
Shima

(10) Patent No.: US 7,106,904 B2
(45) Date of Patent: Sep. 12, 2006

(54) FORM IDENTIFICATION METHOD

(75) Inventor: Yoshihiro Shima, Tokyo (JP)

(73) Assignees: Hitachi, Ltd., Tokyo (JP); Hitachi Computer Peripherals Co., Ltd., Kanagawa (JP)

( * ) Notice: Subject to any disclaimer, the term of this patent is extended or adjusted under 35 U.S.C. 154(b) by 726 days.

(21) Appl. No.: 10/041,603

(22) Filed: Jan. 10, 2002

(65) Prior Publication Data

US 2002/0159639 A1 Oct. 31, 2002

(30) Foreign Application Priority Data

Apr. 25, 2001 (JP) .............................. 2001-127639

(51) Int. Cl.
*G06K 9/62* (2006.01)
*G06K 9/32* (2006.01)

(52) U.S. Cl. ...................................... 382/216; 382/296

(58) Field of Classification Search ................ 382/209, 382/216–218, 224, 288, 296, 297
See application file for complete search history.

(56) References Cited

U.S. PATENT DOCUMENTS

| | | | | |
|---|---|---|---|---|
| 4,949,392 A | * | 8/1990 | Barski et al. ................ | 382/283 |
| 5,276,742 A | * | 1/1994 | Dasari et al. ................ | 382/297 |
| 6,111,984 A | * | 8/2000 | Fukasawa .................... | 382/209 |
| 6,778,703 B1 | * | 8/2004 | Zlotnick ...................... | 382/218 |
| 6,785,428 B1 | * | 8/2004 | Stolin .......................... | 382/295 |
| 6,798,905 B1 | * | 9/2004 | Sugiura et al. .............. | 382/168 |

FOREIGN PATENT DOCUMENTS

| | | |
|---|---|---|
| JP | 61-59568 | 3/1986 |
| JP | 62-184585 | 8/1987 |
| JP | 6-103411 | 4/1994 |
| JP | 7-114616 | 5/1995 |
| JP | 7-249099 | 9/1995 |
| JP | 8-125855 | 5/1996 |
| JP | 8-255236 | 10/1996 |
| JP | 8-315068 | 11/1996 |
| JP | 9-319824 | 12/1997 |
| JP | 11-66228 | 3/1999 |
| JP | 11-85900 | 3/1999 |
| JP | 11-232376 | 8/1999 |
| JP | 2000-123174 | 4/2000 |

(Continued)

OTHER PUBLICATIONS

Y. Musha et al., "Image Laboratory", Nihon Kogyo Syuppan, vol. 11, No. 9, pp. 5-9, Sep. 2000.

*Primary Examiner*—Vikkram Bali
*Assistant Examiner*—Colin LaRose
(74) *Attorney, Agent, or Firm*—Mattingly, Stanger, Malur & Brundidge, P.C.

(57) ABSTRACT

A form identification method which can identify forms without errors even if a form is inputted from a scanner in different direction or the form is enlarged/shrunk. A form registration method which enables change/modification of forms when form types are pre-registered. Inputted points as features are extracted from the form, modification of enlargement/shrinkage, rotation, or skew is made to the inputted points. Form types are identified based on minimum distances between the inputted point and pre-registered dictionary points. When registering a similar form type, warning can be displayed on the screen. In a system a dictionary registration station, a form identification station, and a form edit station are connected via a communication network. Each station operates in interlocking manner, identifies inputted forms, and registers them into a dictionary.

2 Claims, 26 Drawing Sheets

FOREIGN PATENT DOCUMENTS

| | | |
|---|---|---|
| JP | 2000-293688 | 10/2000 |
| JP | 2000-306030 | 11/2000 |
| JP | 2000-339406 | 12/2000 |

* cited by examiner

FIG.18
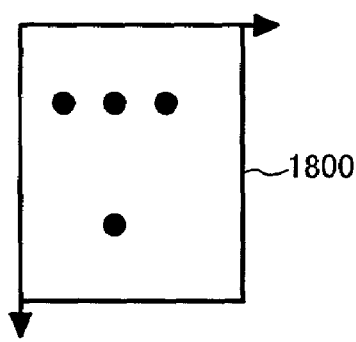
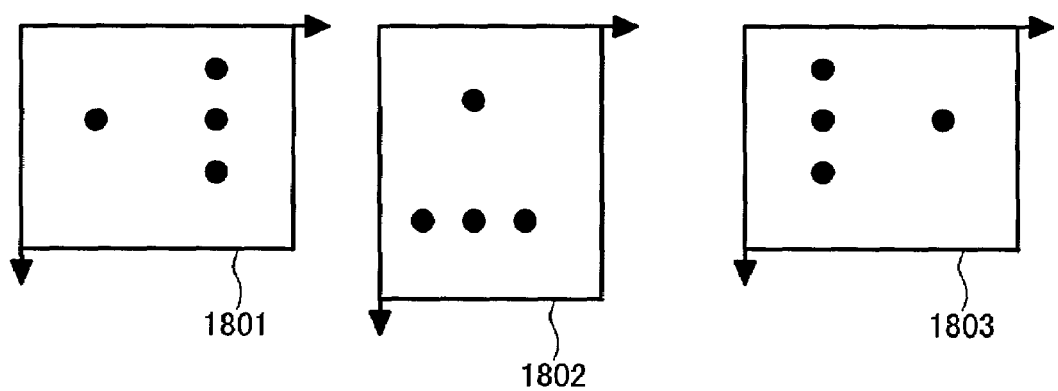

FIG.20
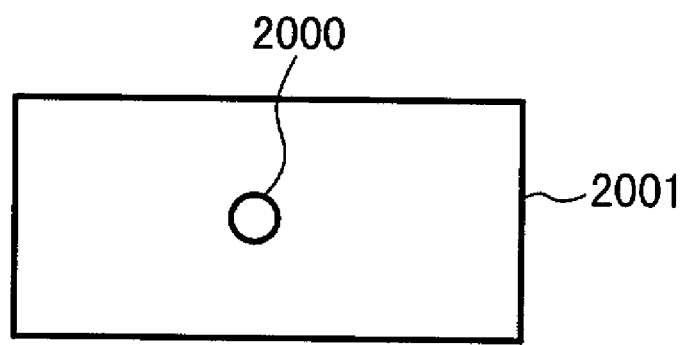
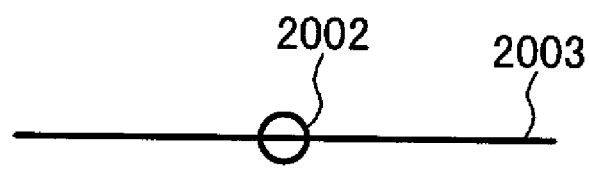
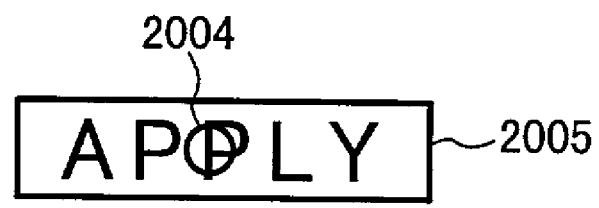

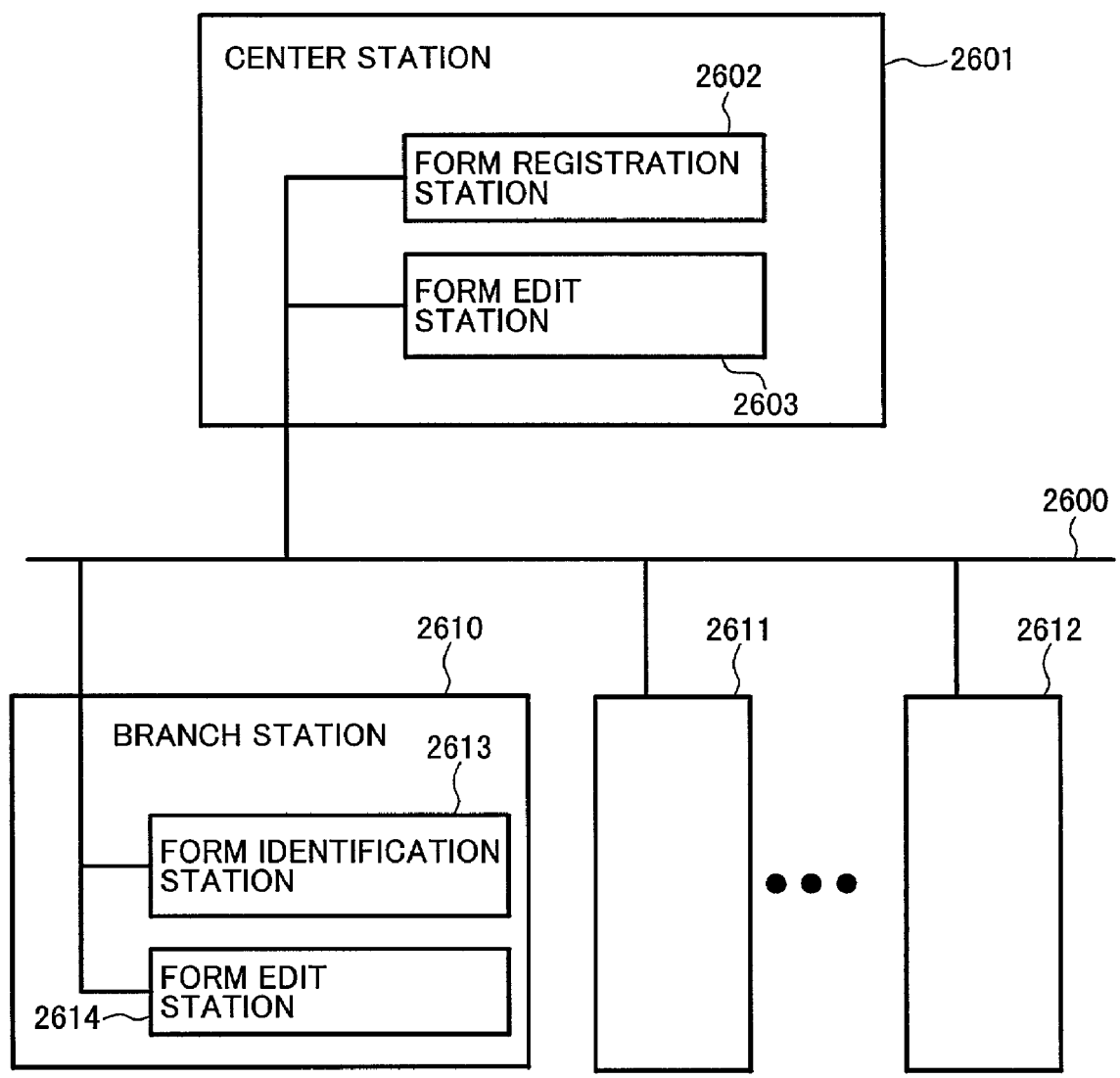

FORM IDENTIFICATION METHOD

BACKGROUND OF THE INVENTION

1. Field of the Invention

The invention relates to a form identification method of identifying a type of form which is read prior to processing of a form in case of reading a plurality of types of forms and a form registration method of registering the identified form. More particularly, the invention relates to a form identification method of enabling a type of form to be stably identified against the form direction, enlargement and shrinkage (or scale-up and scale-down), and skew of the form and to a form registration method.

2. Description of the Related Art

As a conventional technique regarding a form identification method, there has been known a method whereby features for identifying the type of form, for example, character codes, character lines, lines or ruled lines, cells, and the like in the form are automatically extracted, the extracted features are subjected to matching with features of the form which have previously been registered on the basis of those features, and the type of form is identified.

As a conventional technique using the lines as a feature of the form identification mentioned above, for example, the techniques disclosed in JP-A-61-59568 and the like have been known. According to such conventional techniques, the type of form is identified by analyzing a structure of the form by using horizontal and vertical lines in the form.

As a conventional technique whereby features of the form identification are expressed by point coordinates and matching is made using the point coordinates, for example, the techniques disclosed in JP-A-62-184585 and the like have been known. Such conventional techniques relate to a method of subjecting a pattern comprising point sets to matching. That is, a degree of matching is obtained to detect a similarity between two point sets and the degree of matching is obtained at a high speed on a block unit basis of blocks divided into small areas in the horizontal and vertical directions, thereby identifying the type of form. For example, the method whereby a center of a cell is set as a feature and matching is made using a hash-table in which the horizontal and vertical directions are set as bases, has been disclosed in JP-A-8-255236. Further, the method whereby a positional relation of a minimum rectangle in a form is obtained from a connecting relation of the row and column directions and an attribute of the minimum rectangle is decided has been disclosed in JP-A-2000-339406.

As a conventional technique using the position of the character line as a feature, for example, the techniques disclosed in JP-A-7-114616 and the like have been known. According to such conventional techniques, in order to identify a format of a detailed bill account of a diagnosis and treatment fee, the form is identified on the basis of a position of the extracted character line.

Further, as a conventional technique regarding the form identification of a form such that the operation to extract each rectangle in the form is unstable because of the enlargement and shrinkage (or scale-up and scale-down) of the form, a blur of the lines, or the like, for example, the technique disclosed in JP-A-2000-306030 has been known. According to this conventional technique, coordinates of a matched rectangle are set as a reference point of a rectangle to be subjected to next matching and matching is made while sequentially moving the reference point.

Hitherto, as a method of searching an image having a similar nature, for example, the technique disclosed in Yoshinori Musha and Atsushi Hiroike, "Image Laboratory", The Japan Industrial Publishing Co., Ltd., Vol. 11, No. 9, pages 5–9, September, 2000, has been known. According to this conventional technique, feature vectors of images are extracted from the images and images near a key-image at a distance between the extracted vectors are collected, and a color feature in a three-primary color space of red, green, and blue and a differential direction feature in which lightness/darkness of a luminance image varies are used as image features. According to the conventional technique, however, nothing is considered with respect to the features of the lines, character lines, and cells which are peculiar to the form image.

As a conventional fingerprints identification method for personal identification, for example, the techniques disclosed in JP-A-2000-293688 and the like have been known. According to such conventional techniques, feature information of an inputted finger prints image and feature information of fingerprints images which have previously been stored are checked for matching and one of the feature information is rotated into a handstanding state or orthogonal state, and the fingerprints are verified. According to such conventional techniques, however, nothing is considered with respect to the features of the lines, character lines, and cells which are peculiar to the form image.

As a conventional method of detecting a rotational angle of a document, for example, the techniques disclosed in JP-A-6-103411 and the like have been known. According to such conventional techniques, the document is rotated by 0°, 90°, 180°, and 270°, character recognition is executed, respectively, and the most correct rotational angle among them is determined as a direction of the document. Such conventional techniques, however, have a problem such that in order to detect the direction of the form, the character recognition is executed at each angle, and it takes a processing time for the character recognition. Moreover, nothing is considered with respect to the identification of a type of form.

As a conventional method of also identifying a rotating direction on a unit basis of 90° (at a right angle) of a form simultaneously with the identification of the form, for example, the technique disclosed in JP-A-7-249099 has been known. According to such a conventional technique, with respect to the forms obtained by rotating the inputted form by 90°, 180°, and 270°, distributions of the lines, that is, the vertical and horizontal lines are obtained and verified with those of the vertical and horizontal lines which have previously been obtained, thereby identifying also the rotating direction on a 90° unit basis of the form which was inputted simultaneously with the identification of the form. The above conventional technique, however, has a problem such that the identification is unstable against a blur or boldface of the line which is used as a feature and, in dependence on an array of contacting characters, a false line such that character strokes are coupled appears, so that an erroneous form identification and an erroneous identification of the rotating direction are made.

As a conventional method of making a form identification by using a line type of cell lines, for example, the techniques disclosed in JP-A-11-66228 and the like have been known. According to such conventional techniques, the type of cell lines is decided and format information for reading the form is generated. As such a kind of techniques, according to the conventional technique disclosed in JP-A-11-85900, a solid line and a broken line are distinguished, thereby identifying the form and, further, the solid line and broken line are handled without being distinguished in terms of identification precision, thereby enabling the form to be identified. Such a conventional technique, however, does not disclose a process for switching so as to validate or invalidate a discrimination of whether the types of lines of every type of form and every cell of the form are used or not.

As a conventional method of enabling the form identification even if there are enlargement and shrinkage (or scale-up and scale-down) of the form, for example, the techniques disclosed in JP-A-2000-306030 and the like have been known. According to such conventional techniques, cells of adjacent forms are verified by sequentially moving the reference point, thereby preventing erroneous matching due to a location shift by the enlargement and shrinkage (or scale-up and scale-down) of the whole form. Such conventional techniques have a problem such that an error occurs in the matching of each cell in the case where the cells are dropped out and the cells cannot be extracted or a case where a false rectangle occurs. Nothing is considered with respect to a shift of the reference position. As techniques of the same kind as that mentioned above, the techniques disclosed in JP-A-2000-123174, JP-A-8-315068, JP-A-7-249099, and the like have been known. Those conventional techniques relate to a method of subjecting an interval of the lines included in a predetermined area to matching and presuming ratios of scaling (or magnifying and shrinking) of the form image from the result of the matching. However, in the matching between the lines, a problem such that if there is a dropout of the lines or a generation of false lines, the matching itself becomes wrong, so that values of the presumed ratios of scaling (or magnifying and shrinking) become erroneous is not solved. Those methods cope with the enlargement and shrinkage (or scale-up and scale-down) relying on the matching of the lines. There is, consequently, a problem such that if the matching of the lines becomes wrong, an error occurs in the enlargement and shrinkage (or scale-up and scale-down).

SUMMARY OF THE INVENTION

Among the foregoing conventional techniques, according to the technique of identifying the direction of the inputted form serving as a target of the form identification, a special mark or a designated character string is printed to a corner of the form which is previously registered and the mark or the like is read out from the inputted form, thereby enabling a type of form to be identified in the case where the form in a state where it is rotated by 90° is set to a scanner or the case where the form in a handstanding state, that is, in a state where it is rotated by 180° is inputted by the scanner. There is, consequently, a problem such that a special designated printing area is necessary for the form and a space of the form cannot be effectively used.

Among the foregoing conventional techniques, according to the foregoing technique disclosed in JP-A-7-249099 as a method of identifying the rotating direction on a 90° unit basis of the form also simultaneously with the identification of the form, with respect to the forms obtained by rotating the inputted form by 90°, 180°, and 270°, the distributions of the lines, that is, the vertical and horizontal lines are obtained and are checked to determine matching with those of the vertical and horizontal lines which have previously been obtained, thereby identifying also the rotating direction on a 90° unit basis of the inputted form simultaneously with the identification of the form. The above conventional technique has a problem such that the identification is unstable when there is a blur or boldface of the line which is used as a feature and, in dependence on an array of contacting characters, a false line that couples character strokes appears, so that an erroneous form identification and an erroneous identification of the rotating direction are made.

Among the foregoing conventional techniques, according to the technique of identifying the form by distinguishing the type of cell lines, the solid line, and the broken line in the inputted form serving as a target of the form identification, nothing is considered with respect to the process for switching so as to validate or invalidate a discrimination of whether the types of lines of every type of form and every cell of the form are used or not. Therefore, the above conventional technique has a problem such that in case of a form such that an interval between the broken lines is narrow or in the case where a point of the broken line becomes bold and is coupled with the adjacent point, so that a solid line is formed, there is a fear that the inputted form is erroneously identified as a different form or the inputted form is rejected because the relevant form cannot be detected. In dependence on the forms, in the case where the forms such that the shapes of the cells are the same, there is no need to distinguish the solid line and broken line, and even if a specific portion is a solid line or broken line, they should be regarded as same forms are mixedly inputted, there is no way except for a method of alternatively selecting either a method whereby the broken lines and the solid lines are regarded as same lines with respect to all types of forms and the form identification is made or a method whereby the broken lines and the solid lines are distinguished and regarded as different forms and the form identification is made. That is, according to such a conventional technique, even with respect to the forms such that there is no need to distinguish the solid line and broken line and, even if the specific portion is either the solid line or the broken line, they should be regarded as same forms, it is necessary to previously individually register a dictionary for form identification and format information for reading the forms. There is a problem such that many operations are required to register the dictionary and a capacity to store the dictionary increases.

Further, among the foregoing conventional techniques, the method of sequentially moving the reference point and executing matching in order to cope with the enlargement and shrinkage (or scale-up and scale-down) of the form has a problem such that if the reference point which was newly set becomes wrong during the matching processing due to a dropout of the lines or a generation of false lines, an error occurs in the form identification or there is a fear that the form is rejected.

Further, all of the conventional techniques described above have a problem such that if the number of types of forms to be registered increases, it is difficult that the user determines whether the form which became newly the registration target has already been registered or not, and if the registered similar form is identified as a same type of form, such a form cannot be distinguished as a similar form.

It is a first object of the invention to solve the foregoing problems of the conventional techniques and to provide a form identification method whereby even in the case where a form whose direction has arbitrarily set and inputted, for example, the form in a state where it is rotated by 90° or in a hand-standing state, that is, in a state where it is rotated by 180° is inputted by the scanner, the type of form is identified with high reliability and, at the same time, the rotating direction of the form can be detected in a manner similar to the case of the form in a normal standing state.

A second object of the invention is to provide a form identification method whereby control information is provided every form which has previously been registered or every cell of the form, a type of cell line, for example, a solid line or a broken line is used, and an identifying mode is switched to either a mode to identify the forms in which the types of cell lines are different although shapes of the cells are the same as different types of forms or a mode to identify the forms in which the types of cell lines are different as same type of forms, thereby enabling the type of form to be identified.

A third object of the invention is to provide a form identification method which can identify a type of form at high precision even if there is a location shift of the form.

A fourth object of the invention is to provide a form identification method which can stably identify a type of form at high precision even if there is a dropout due to a blur or the like of lines or an appearance of a false line or even if there are enlargement and shrinkage (or scale-up and scale-down) of the form.

A fifth object of the invention is to provide a form identification method comprising: a screen interface for allowing the user to determine by the eyes whether a form newly serving as a registration target has already been registered or not; a function for editing the target form, printing it, and retrying the registration; and a function for guaranteeing the fact that a dictionary for form identification corresponding to the printed form has been stored.

A form identification method according to the invention is characterized in that a center or centers of one or a plurality of cells is/are extracted as a feature/features from inputted forms, either an inputted feature of the inputted form or a feature of the registered form which has previously been registered is rotated on a 90° unit basis, the inputted feature and the registered feature are verified, an angle at which those features most coincide is set to a direction of the form, and the form type corresponding to the feature is outputted as a form identification result. Consequently, even in the case where the form is set into a scanner in the direction in which the form is rotated by 90° or the case where the form in a handstanding state, that is, in a state where the form is rotated by 180° is inputted to the scanner, the form can be identified in a manner similar to the form in the normal standing state. The center of the cell as a feature can be more stably extracted and an identification error can be reduced more than those of other features, for example, a projection histogram of lines, and the like. This is because although the lines are extracted as false lines also in a character line, by extracting the cell whose four sides are constructed by the lines, since the lines of the cell are used as cell lines, an erroneous extraction can be reduced.

The form identification method according to the invention is characterized in that a type of cell line is extracted from the inputted form, a coincidence with the type of cell line of the form which has previously been registered is obtained, thereby enabling the forms in which the types of cell lines are different although the shapes of cells are the same to be identified as different types of forms, and further, enabling the forms in which the types of cell lines are different to be identified as a same type of forms so long as the shapes of cells are the same.

The form identification method according to the invention is characterized in that each position having a feature of the inputted form is verified while moving the position parallel in the horizontal and vertical directions at a fixed width from a reference position of the feature which has previously been registered, the parallel moving position where it most coincides with the registered feature is set to the position of the inputted form, and the type of form corresponding to the feature is outputted as a form identification result, thereby enabling the form to be identified even if there is a location shift of the form.

The form identification method according to the invention is characterized in that the matching of the feature of the form and the enlargement and shrinkage (or scale-up and scale-down) of the feature are made independent, and the feature is enlarged and shrunk irrespective of an error of the feature matching. In this instance, each position having a feature of the inputted form is enlarged and shrunk in the horizontal and vertical directions at every fixed ratio of scaling (or magnifying or shrinking). The ratio of scaling (or magnifying or shrinking) at which the feature of the form most coincides with the registered feature is outputted as a ratio of scaling (or magnifying or shrinking) of the inputted form and the type of form corresponding to the feature is outputted as a form identification result, thereby enabling the form to be identified even if there are enlargement and shrinkage (or scale-up and scale-down) of the form.

The form identification method according to the invention is characterized in that the form image newly serving as a registration target and the registered form image which was determined to be a similar form by the form identification are displayed on a screen, the user is allowed to input decision information of whether the relevant form has already been registered or not, data of the target form to register the target form as a new form is edited, printed, and retried to be registered again, thereby enabling the form to be identified.

According to the present invention, there is provided a form identification method of verifying the matching between a feature of an inputted form and features of registered forms, whereby inputted points obtained by adding point coordinates to the feature of the inputted form and dictionary points (or template points) obtained by adding point coordinates to the features of the registered forms are provided, a distance between the inputted point and the dictionary point is calculated, if the distance is equal to or less than a fixed value, it is decided that the dictionary point corresponding to the inputted point exists, and a degree of coincidence of the pattern matching is obtained on the basis of the number of corresponding points, the number of inputted points, and the number of dictionary points (or template points), thereby enabling the form to be identified at high precision.

BRIEF DESCRIPTION OF THE DRAWINGS

FIG. 18 is a diagram for explaining a process for rotating cell coordinates by 90° in step 500 in FIG. 5;

FIG. 20 is a diagram for explaining an example of features of form images which are used in the form identification;

FIG. 26 is a block diagram showing an example of a construction of a system in which a processing center and branches and offices at remote locations are connected to a network and a form identification is made.

DESCRIPTION OF THE EMBODIMENTS

Some embodiments of a form identification method and a form registration method according to the invention will be described in detail hereinbelow with reference to the drawings.

Figure 1:
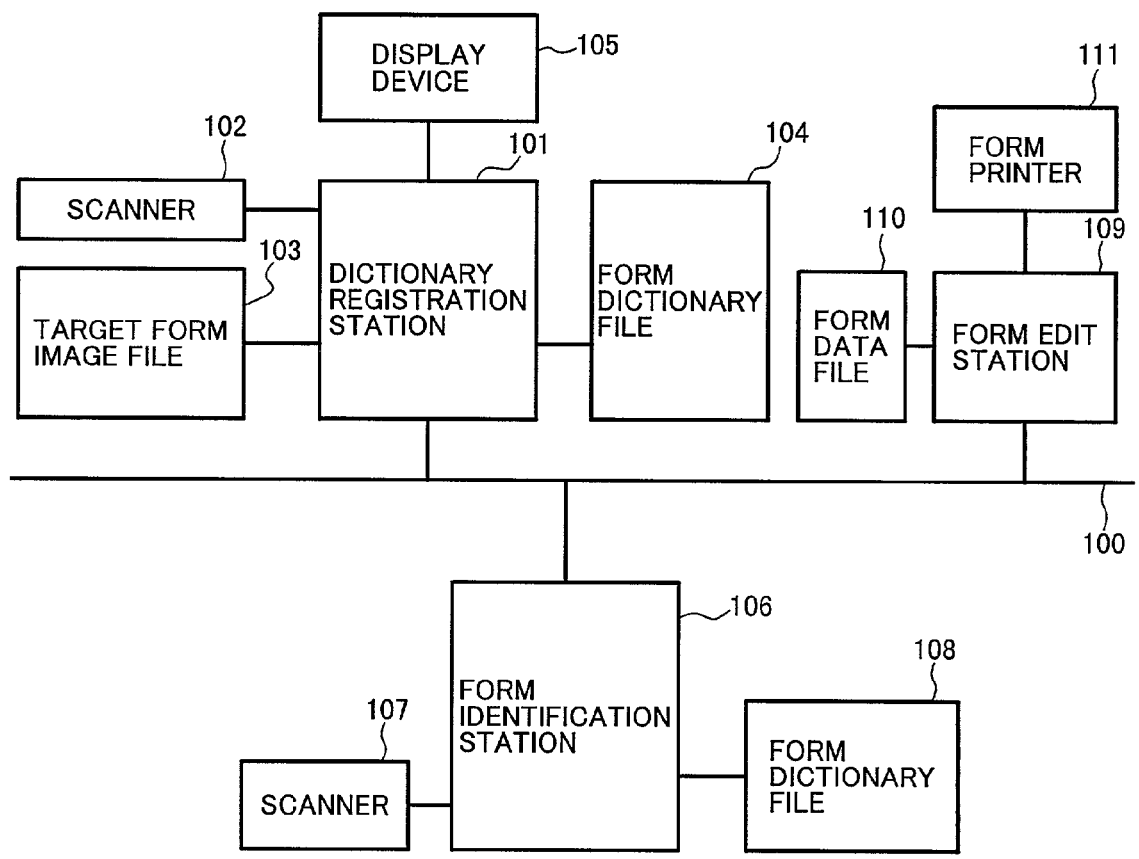
FIG. 1 is a block diagram showing a constructional example of a form identification system for making a form identification and a form registration according to an embodiment of the invention.

FIG. 1 is a block diagram showing an example of a construction of a form identification system for making a form identification and a form registration according to the embodiment of the invention. In FIG. 1, reference numeral 100 denotes a communication network; 101 a dictionary registration station; 102 and 107 scanners; 103 a registration target form image file; 104 and 108 form dictionary files; 105 a display device; 106 a form identification station; 109 a form edit station; 110 a form data file; and 111 a form printer.

The form identification system shown in FIG. 1 is constructed by connecting the dictionary registration station 101, form identification station 106, and form edit station 109 via the communication network 100, and those stations can mutually operate in an interlocking relational manner. The dictionary registration station 101 previously registers features of form images in order to identify the type of form. The dictionary registration station 101 is equipped with: the scanner 102 for collecting the form images; the registration target form image file 103 for storing the form images serving as registration targets; and the form dictionary file 104 for storing features of the registered form images. The dictionary registration station 101 has the display device 105. The registered form images and new form images collected by the scanner are displayed on the screen of the display device 105, thereby performing the registering operation in an interactive manner.

The form identification station 106 identifies the types of form images inputted from the scanner 107 by using the form dictionary file 108 for storing the features of the registered form images. Contents of the form dictionary file 108 are the contents obtained by copying the form dictionary file 104 on the dictionary registration station 101 side and can be always updated to the latest data through the communication network. As a form dictionary file which is used for form identification, it is also possible to use the file obtained by accessing the form dictionary file 104 on the dictionary registration station side through the communication network.

The form edit station 109 is equipped with the form data file 110 and form printer 111 and prints a form onto a paper by using the form printer 111 with respect to the form data stored in the form data file 110. The form edit station 109 edits the form data so as to make the form identification easy and prints the form images. In the dictionary registration station 101, the printed form images are collected by the scanner 102 and a retry to newly register them can be performed.

Figure 2:
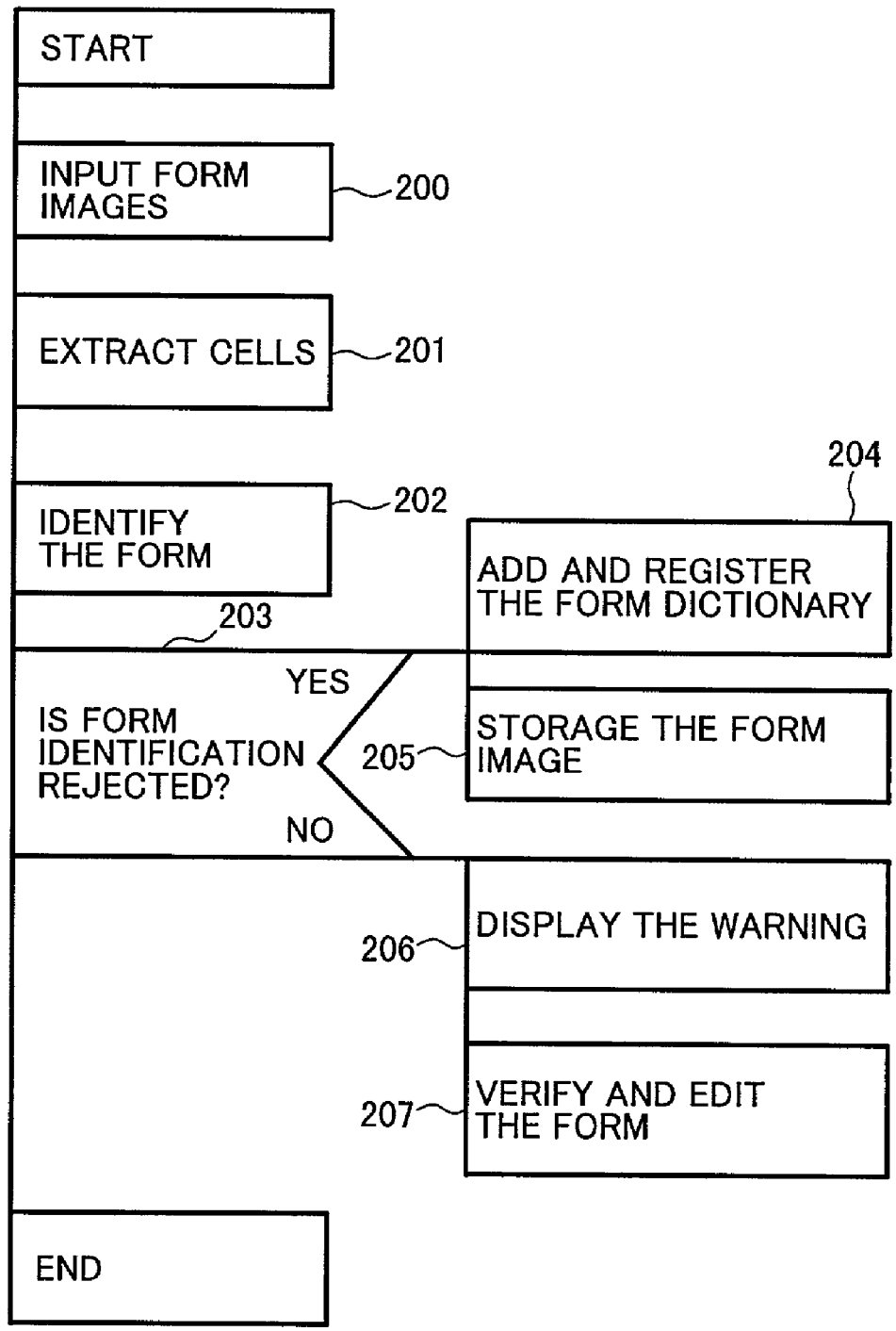
FIG. 2 is a flowchart for explaining the processing operation of a dictionary registration for form identification in a dictionary registration station.

FIG. 2 is a flowchart for explaining the processing operation of a dictionary registration for form identification in the dictionary registration station 101. This processing operation will be described hereinbelow.

(1) First, the form images are inputted and cells are extracted as features of the form images. This process is a process for extracting horizontal and vertical lines from the form images and extracting the cells on the basis of cross points of them. Further, coordinates of centers in the cells are extracted as features. Generally, since a plurality of cells are extracted, the coordinates of centers of a plurality of cells are extracted as features (steps 200 and 201).

(2) Subsequently, form dictionaries which have already been registered and the features extracted from the inputted forms are subjected to matching processing, thereby obtaining an identification value representing the degree of matching (step 202).

(3) Whether an identification result is rejected or accepted is determined on the basis of the identification value in step 202. For simplicity of the process here, it is possible to decide it in a manner such that if the identification value is larger than a fixed value, the identification result is accepted and, if the identification value is smaller than the fixed value, the identification result is rejected (step 203).

(4) If it is determined in step 203 that the identification result is rejected, the relevant features extracted from the inputted forms are additionally registered as a dictionary into the form dictionary file 104 and the relevant form images are stored as a registration target form image file 103 (steps 204 and 205).

(5) If it is determined in step 203 that the identification result is accepted, since there is a possibility that the inputted forms have already been registered or similar forms have been registered, a warning is displayed on the display device 105 and, at the same time, the registered form images are read out from the registration target form image file 103, the inputted form images and the registered form images are displayed on the screen, and the confirmation of the relevant forms and the change in forms in the form edit station 109 are executed (steps 206 and 207).

As described above, the dictionary registration station 101 displays the form images serving as registration targets and the registered form images which were determined to be similar images by the form identification onto the screen, allows the user to decide whether the relevant forms have already been registered or not. Resultant decision information is inputted. Consequently, the data of the target forms to register the target forms as new forms is edited, printed, and retried to be registered again.

Figure 3:
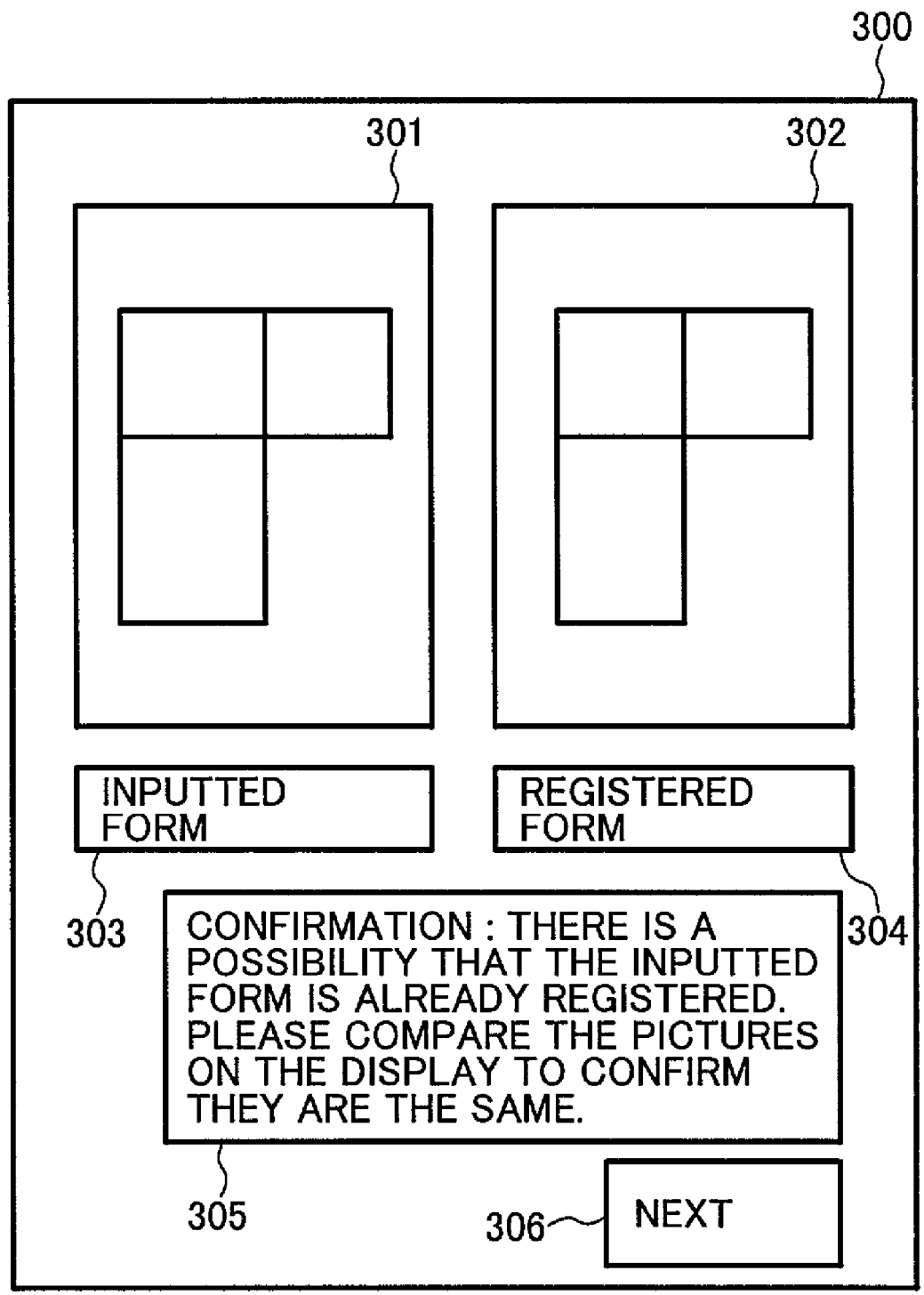
FIG. 3 is a diagram for explaining an example of a screen display for performing an interactive operation in the dictionary registration described in FIG. 2.

FIG. 3 is a diagram for explaining an example of a screen display for performing an interactive operation in the dictionary registration described in FIG. 2. An inputted form image 301 and a registered form image 304 as a registered form or a similar form are displayed on a display screen 300 of the display device 105.

Explanation sentences 303 and 304 of the display image are displayed on the display screen 300. A warning sentence 305 is also displayed on the display screen 300 in order to instruct the user about the necessity of the confirmation. A click button 306 to shift to the process of the form edit station 109 for editing the data of the target forms and printing it is also displayed.

Figure 4:
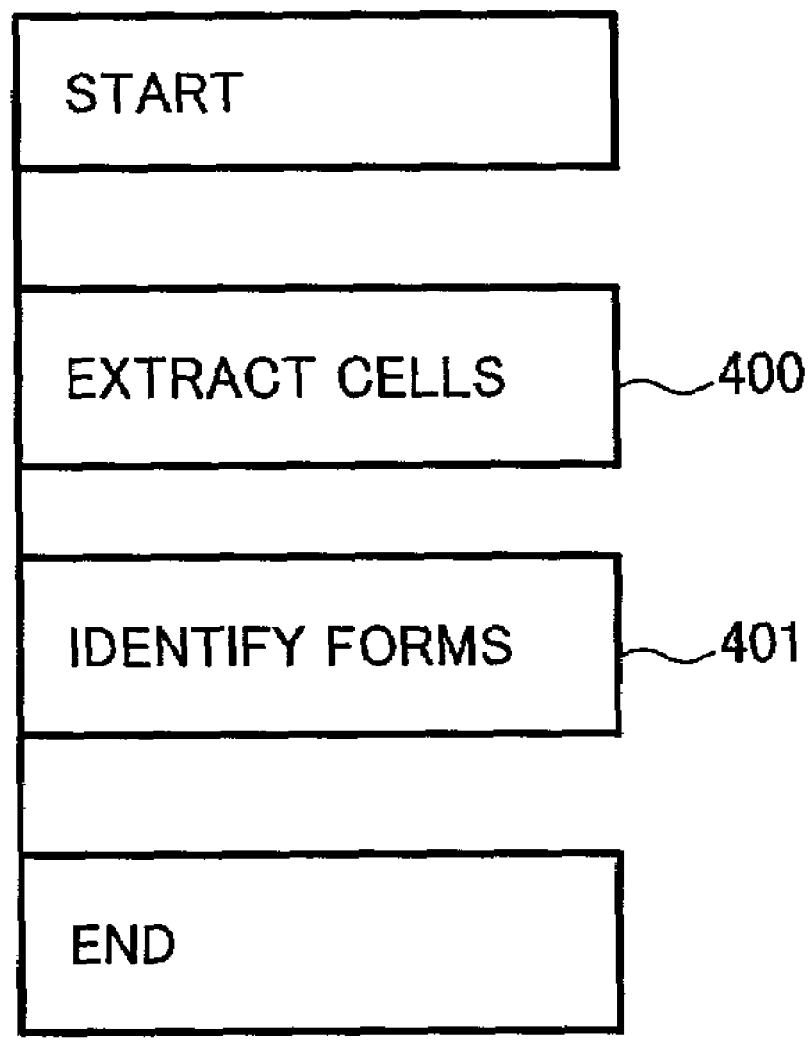
FIG. 4 is a flowchart for explaining the operations for a feature extracting process and a form identifying process of an inputted form in a form identification station.

FIG. 4 is a flowchart for explaining the operations for the feature extracting process and the form identifying process of the inputted forms in the form identification station 106. In the flowchart shown in FIG. 4, features for form identification are extracted from the inputted form image in step 400. In the example described here, the coordinates of the centers of all cells in the form are extracted as features. However, the feature is not limited to the coordinates of the center of the cell. For example, the coordinates of the centers of the lines or the coordinates of the centers of the character lines can be also used as features. Subsequently, a type of form is identified on the basis of the extracted features in step 401.

Figure 5:
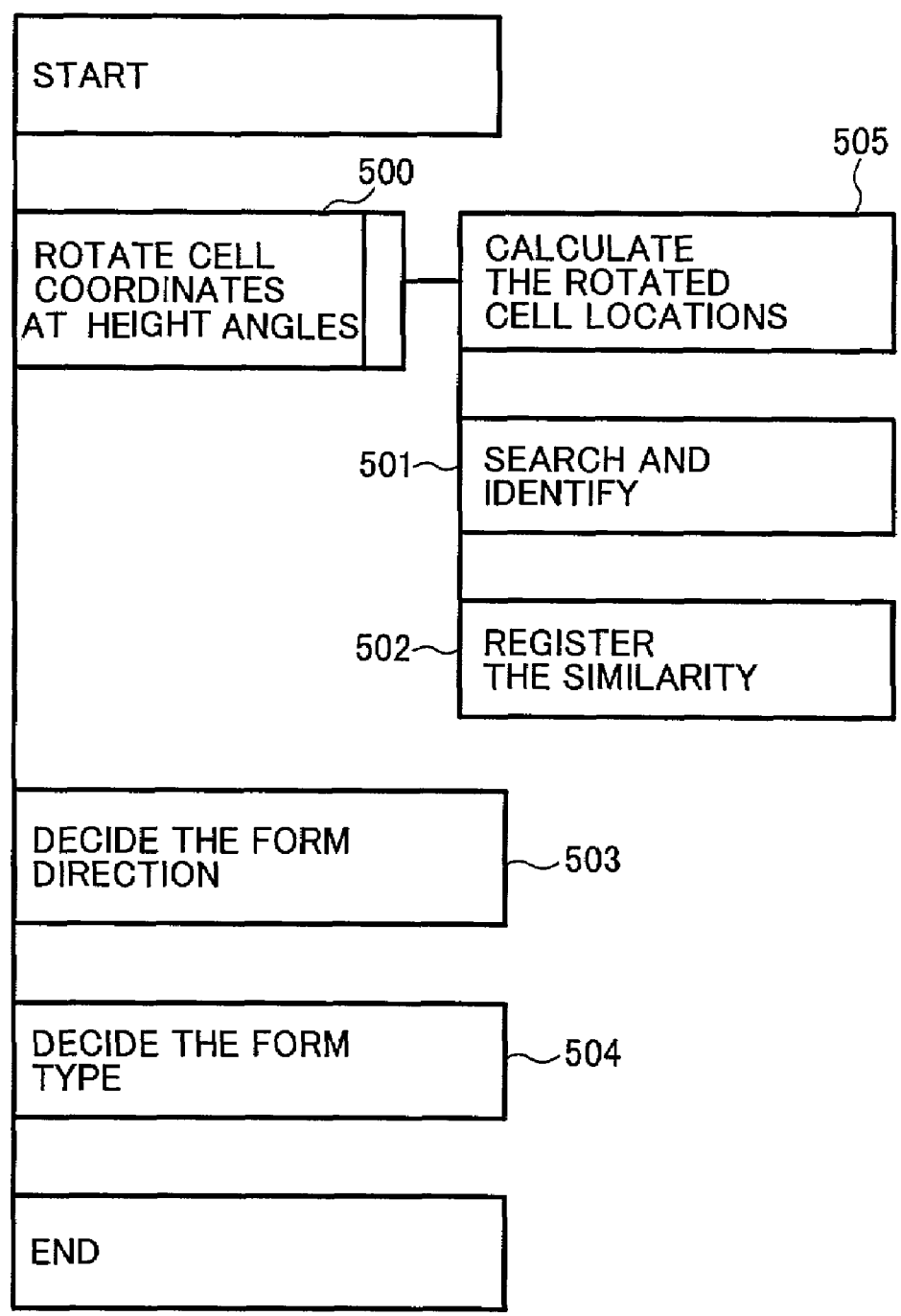
FIG. 5 is a flowchart for explaining the operation for the form identifying process in step 401 in FIG. 4.

FIG. 5 is a flowchart for explaining the operation for the form identifying process in step 401 in FIG. 4 and will be explained hereinbelow.

(1) The features of the inputted form images extracted in step 400 in FIG. 4, that is, the coordinates of the centers (inputted points) of the cells are rotated on a 90° unit basis. In this instance, three kinds of rotations of a clockwise rotation of 90°, a counterclockwise rotation of 90°, and a vertical-reverse rotation of 180° are executed. Those rotations can be realized by replacing the coordinates of the centers of the cells as features (step 500).

(2) Center coordinates are obtained with respect to the case of each of the three kinds of rotations in step 500 and the case where the coordinates are not rotated, and a search and an identification (matching) in step 501 and registration of similarity in step 502, which will be explained hereinlater, are repeated (step 505).

(3) In the searching and identifying process, the matching between the inputted points and the dictionary points is checked while moving the reference position parallel in the horizontal direction at a fixed width and, subsequently, moving it parallel in the vertical direction. In the similarity registering process, similarity obtained by the identification every rotational angle set in step 500 is obtained and this similarity and the rotational angle are registered (steps 501 and 502).

(4) Subsequently, the rotational angle having the maximum similarity among the registered similarities at the respective rotational angles is determined as a direction of the form and, further, the type of dictionary having the maximum similarity is determined as a type of the corresponding form (steps 503 and 504).

Figure 6:
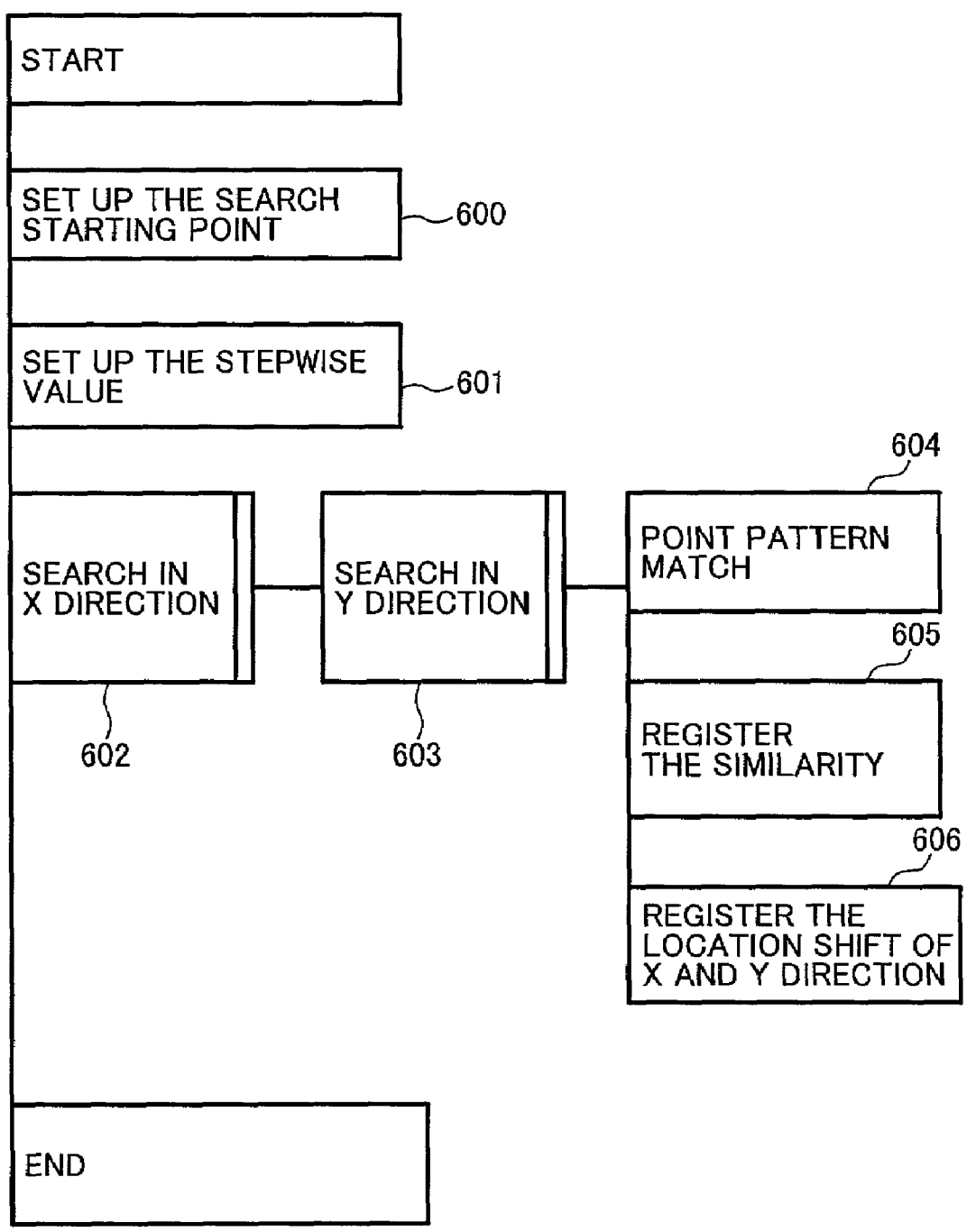
FIG. 6 is a flowchart for explaining the operation for a searching and matching process in step 501 in FIG. 5.

FIG. 6 is a flowchart for explaining the operation for the searching and identifying process in step 501 in FIG. 5 and will be explained hereinbelow.

(1) First, a search start point for moving the reference position of the point coordinates parallel is set up and, subsequently, a search stepwise value from the reference position, that is, a unit of the parallel movement of the reference position is set up (steps 600 and 601).

(2) The processes in steps 604, 605, and 606 are repeated while shifting the X direction of the reference position by the set-up stepwise value and, further, shifting the Y direction of the reference position by the set-up stepwise value (steps 602 and 603).

(3) In the point pattern matching process, the matching between the inputted points and the dictionary points is executed until all over the dictionary or for all the entries in the dictionally. In the similarity registering process, the similarity of the point pattern matching and the location shifts of the X and Y directions at that time are registered (steps 604 and 605).

(4) In the processes in steps 604 and 605, the similarity of the point pattern matching of each of a plurality of combinations of the rotation and the location shifts of the X and Y directions and the location shifts of the X and Y directions at that time are registered. Therefore, the type of dictionary having the location shifts of the X and Y directions having the maximum similarity among them is registered together with the location shifts of the X and Y directions. The registered location shifts of the X and Y directions are used later for processes for deciding one cell to be read among the cells in the form and reading characters and the like in the cell (step 606).

Figure 7:
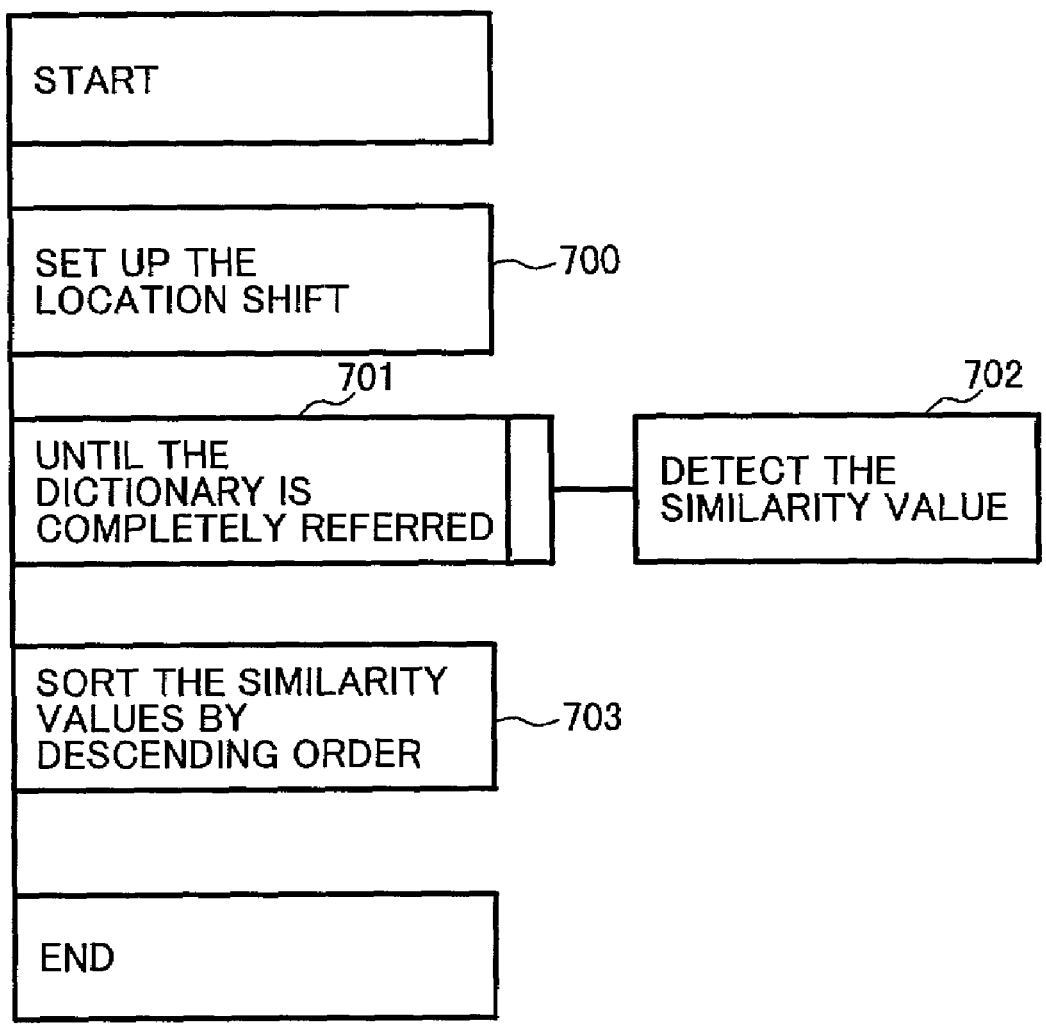
FIG. 7 is a flowchart for explaining the operation for a point pattern matching process in step 604 in FIG. 6.

FIG. 7 is a flowchart for explaining the operation for the point pattern matching process in step 604 in FIG. 6. In the flowchart of FIG. 7, first, in step 700, the location shift from the reference position is set up. Subsequently, in step 701, the detection of the similarity value in step 702 is repeated until the dictionary is completely referred. In step 703, the types of forms are sorted in descending order from the larger one of the detected similarity values.

Figure 8:
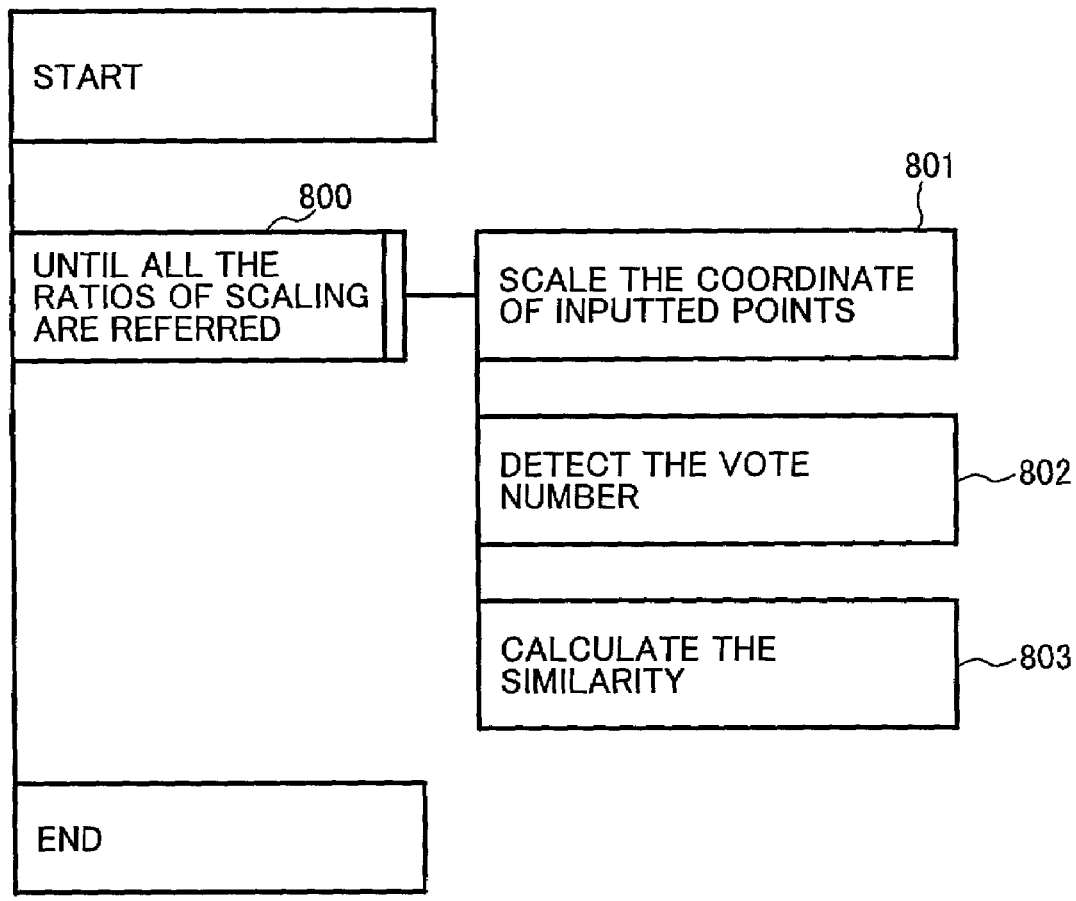
FIG. 8 is a flowchart for explaining the operation for a similarity value detecting process in step 702 in FIG. 7.

FIG. 8 is a flowchart for explaining the operation for the similarity value detecting process in step 702 in FIG. 7 and will be explained hereinbelow. This process intends to detect the similarity values on the assumption that there are enlargement and shrinkage (or scale-up and scale-down) of the inputted forms, and a plurality of ratios of scaling (or magnifying and shrinking) are presumed. Since the identifying or matching process and the enlarging and shrinking (or scale-up and scale-down) process are independently executed, the above process has an advantage such that it is not influenced by an error of the identifying process.

(1) First, a plurality of ratios of scaling (or magnifying and shrinking) are set up and a mode to repeat processes in steps 801, 802, and 803 until all the ratios of scaling are referred, is set (step 800).

(2) The inputted point coordinates are enlarged and shrunk (or scale-up and scale-down) in accordance with the corresponding ratios of scaling (or magnifying and shrinking). There are effects such that by this process, since the enlargement and shrinkage (or scale-up and scale-down) of the inputted point coordinates are performed by presuming a plurality of kinds of ratios of scaling (or magnifying and shrinking), even if the form is enlarged and shrunk, the similarity value can be calculated, and even if a dropout and a generation of false points occur in the points which are used as features, the similarity value can be calculated with high reliability (step 801).

(3) Subsequently, the number of dictionary points which were subjected to the matching with the inputted points is obtained as the number of votes, the number of votes is detected, and the similarity is calculated on the basis of the number of votes, the number of inputted points, and the number of dictionary points (steps 802 and 803).

In the foregoing process, for example, a percentage obtained by dividing the number of votes by the sum of the number of inputted points and the number of dictionary points can be used as a method of calculating the similarity. That is, the similarity is obtained by the percentage of a quotient obtained by the following division.

(the number of votes)/(the number of inputted points+the number of dictionary points)

As a similarity value, for example, it is possible to use a percentage obtained by dividing the number obtained by subtracting a difference between the number of inputted points and the number of dictionary points from the number of votes by the sum of the number of inputted points and the number of dictionary points. That is, in this instance, the similarity is obtained by the percentage of a quotient obtained by the following division.

(the number of votes−absolute value)/(the number of inputted points+the number of dictionary points) where, absolute value=(the number of dictionary points−the number of inputted points)

In this case, since the percentage is obtained by subtracting the difference between the number of inputted points000 and the number of dictionary points from the number of votes, there is an effect such that if a number of inputted points are detected, the similarity can be reduced by decreasing the number of votes.

Figure 9:
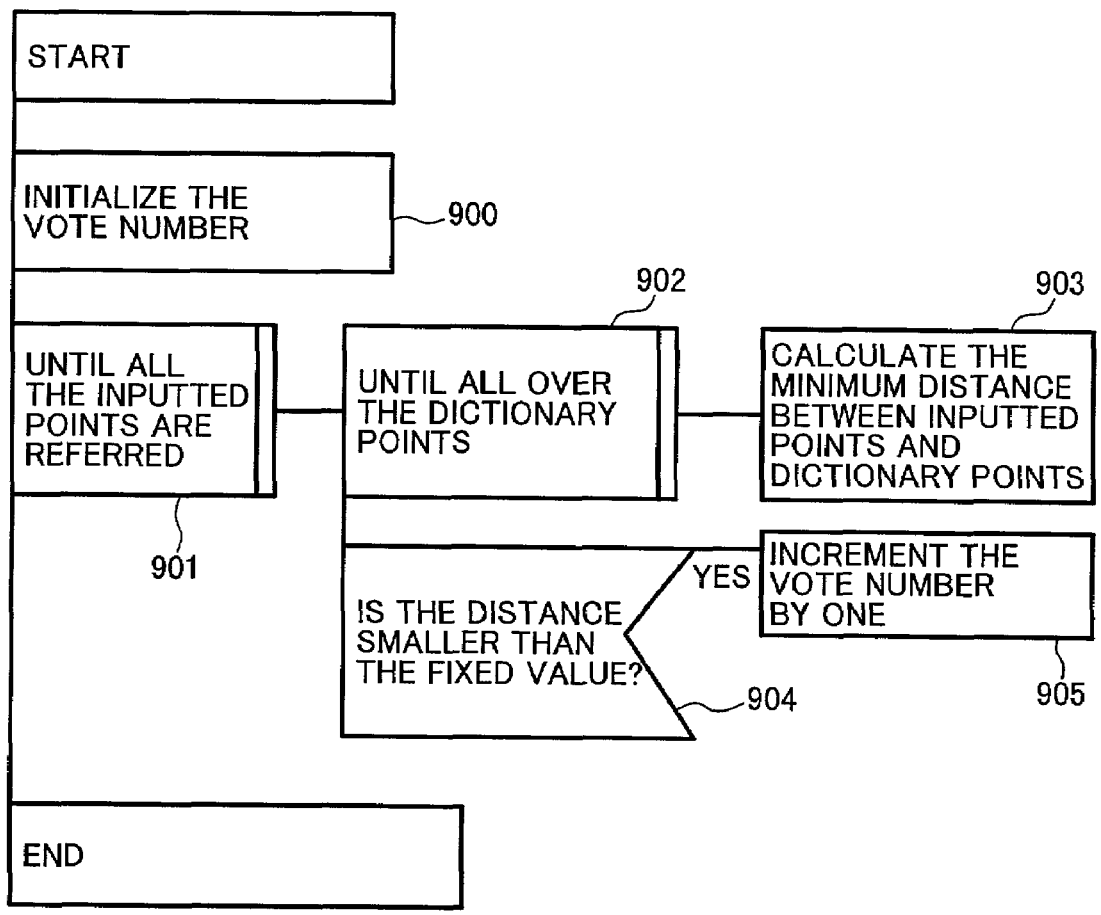
FIG. 9 is a flowchart for explaining the operation for a vote number detecting process in step 802 in FIG. 8.

FIG. 9 is a flowchart for explaining the operation for the vote number detecting process in step 802 in FIG. 8. According to this process, among the dictionary points existing near the inputted point of interest, the dictionary point existing at a location of the minimum distance is obtained, whether the dictionary point to be subjected to the matching exists or not is determined on the basis of the length of the minimum distance, and the number of such inputted points which have dictionary points is counted as the number of votes.

In the flowchart of FIG. 9, first, in step 900, the number of votes is initialized. In step 901, a process for repeating processes in step 902 and subsequent steps until all the inputted points are referred, is set up. By the processes in steps 902 and 903, the minimum distance between the inputted points and the dictionary points is calculated until all over the dictionary points. Whether the minimum distance is smaller than a fixed value or not is discriminated in step 904. If it is smaller, the value of the number of votes is increased by "1" in step 905. By repeating the above processes, the number of votes can be calculated.

Figure 10:
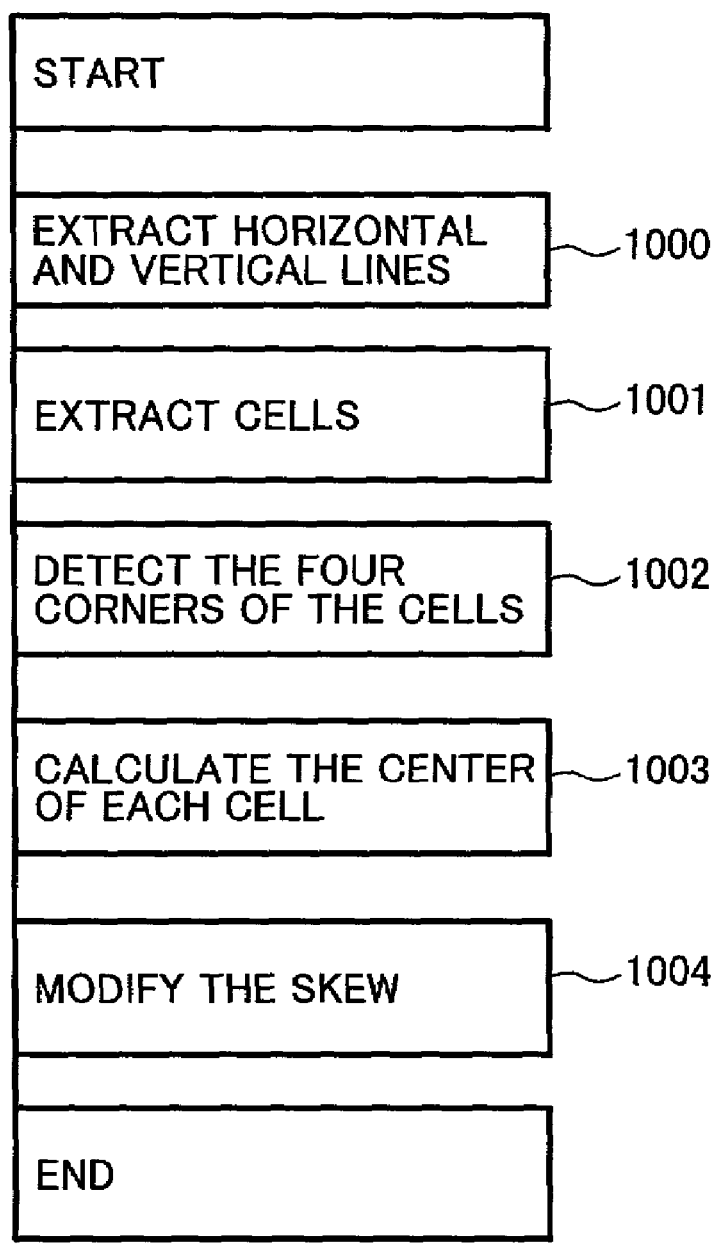
FIG. 10 is a flowchart for explaining the operation for a cell extracting process in step 400 in FIG. 4.

FIG. 10 is a flowchart for explaining the operation for the cell extracting process in step 400 in FIG. 4 and will be explained hereinbelow.

(1) First, horizontal and vertical lines are detected from the form images. In this process, the image is expressed by a set of black line segments, that is, black-runs and the black-run of a long line segment is extracted as a horizontal line. A vertical line is extracted by rotating the image by 90° and similarly extracting the black-run of a long line segment. As another method, a method of fetching the cell lines by extracting an outline of a block of black pixels can be also used (step 1000).

(2) The cells are subsequently detected. The detection of the cells can be performed by fetching the cells from the cross points of the vertical and horizontal lines. As a detailed cell detecting method, it is possible to use the method disclosed in JP-A-8-125855(step 1001).

(3) Subsequently, coordinates of four corners of each of the cells are detected, coordinates of the center of each cell are calculated, and the coordinates of the centers are set to features for form identification (steps 1002 and 1003).

(4) Further, a skew modification (or correction) is made to the center coordinates on the basis of a micro inclination angle of the form detected from a skew of the cell lines and a skew of the form edges. The modification is a correction of the point coordinates for the micro inclination angle and made by the process in step 505 which has already been described with respect to the rotation of the 90° unit. The center coordinates obtained by making the skew modification to the micro inclination angle as mentioned above are set to the features for form identification (step 1004).

Figure 11:
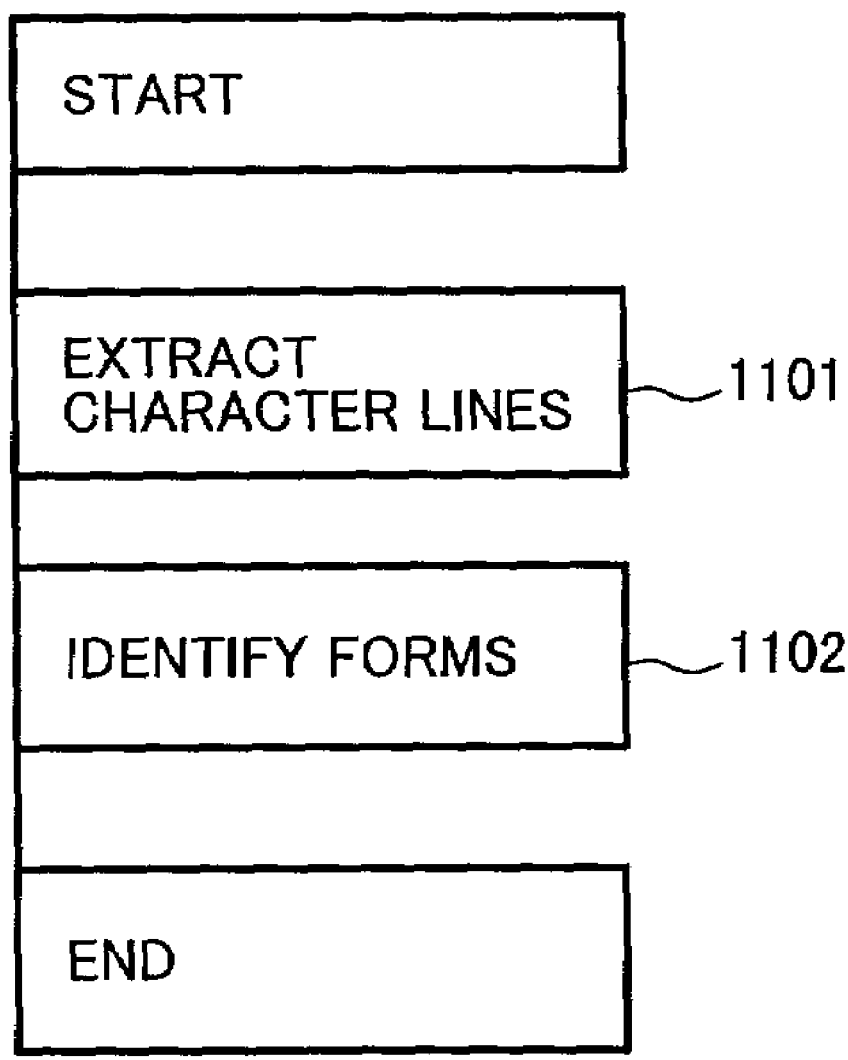
FIG. 11 is a flowchart for explaining another example of the operations for the feature extracting process and form identifying process of an inputted form in a form identification station 106.

FIG. 11 is a flowchart for explaining another example of the operations for the feature extracting process and form identifying process of the inputted form in the form identification station 106 and shows another example of processes different from those described in conjunction with FIG. 4. This process intends to make the form identification by using the position coordinates of the character lines as features.

In the flowchart shown in FIG. 11, the character lines are extracted from the inputted form images by a process in step 1101. As a method of the detailed character line extraction, the extraction processing method of bar code lines disclosed in JP-A-11-232376 can be used. The coordinates of the character lines, for example, the coordinates of the centers in the character lines are set to features, thereby making the form identification by a process in step 1102. As a form identifying process in step 1102, a process similar to that in step 401 in FIG. 4 can be executed.

Figure 12A:
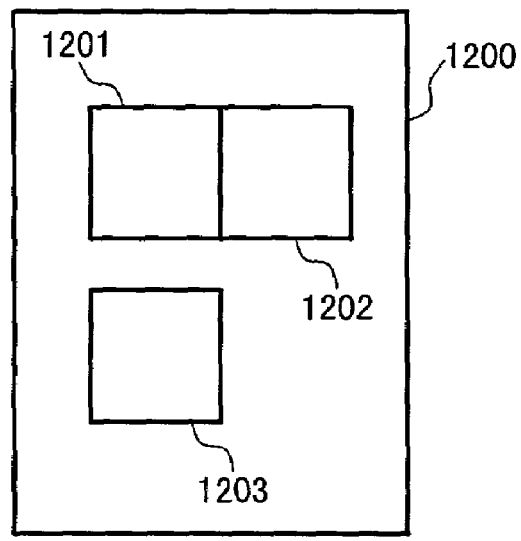
FIGS. 12A and 12B are diagrams for explaining centers of cells as features of the form identification for explaining the cell extracting process in step 400 in FIG. 4.
Figure 12B:
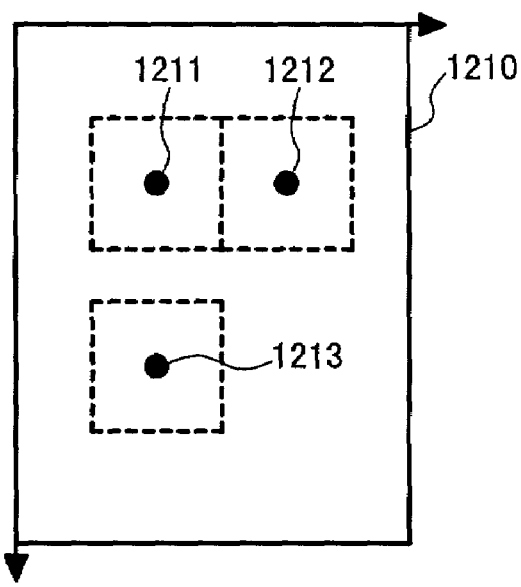
Figure 13A:
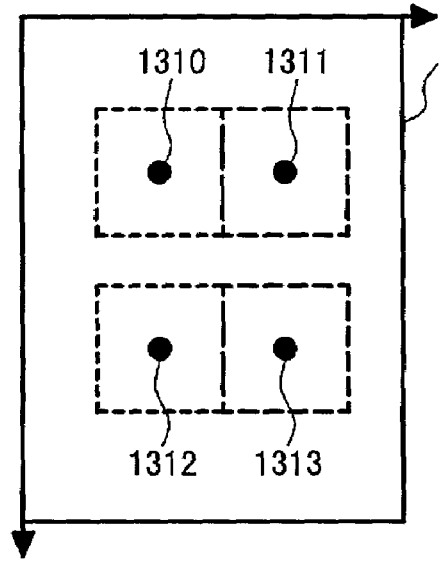
FIGS. 13A to 13D are diagrams for explaining dictionary points stored in a form dictionary file.
Figure 13B:
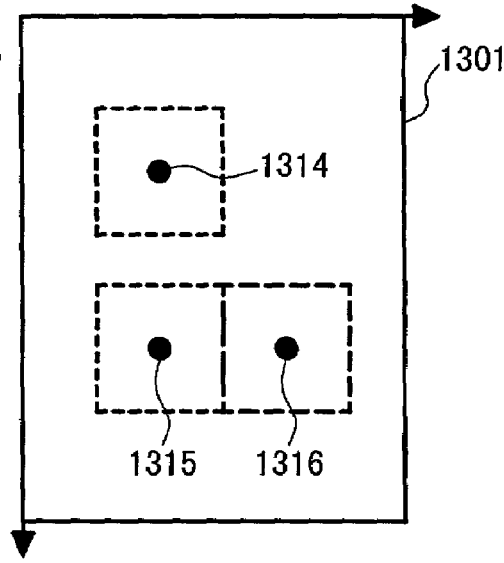
Figure 13C:
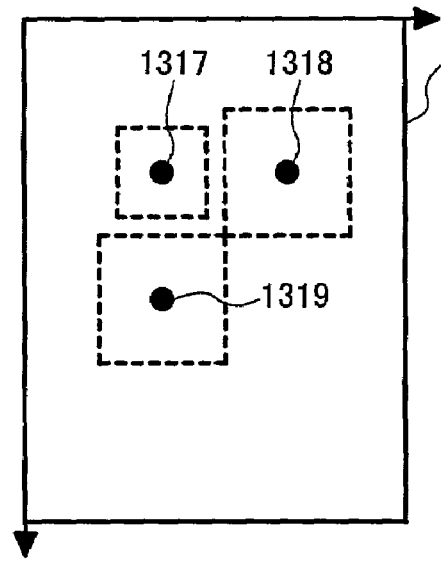
Figure 13D:
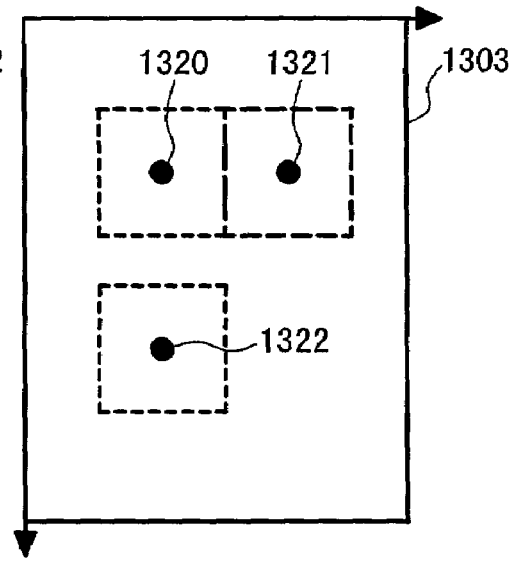

FIGS. 12A and 12B are diagrams for explaining the cell extracting process in step 400 in FIG. 4 and are diagrams for explaining centers of the cells as features of the form identification. FIG. 12A shows an example of an inputted form image 1200. In this example, three cells 1201, 1202, and 1203 exist in the inputted form image 1200. FIG. 12B shows a resultant image 1210 in the case where centers 1211, 1212, and 1213 of cells in the inputted form image 1200 are extracted. The center in each cell is expressed as coordinates in the horizontal and vertical directions.

FIGS. 13A to 13D are diagrams for explaining the dictionary points stored in the form dictionary file 104 or 108. Examples of the dictionaries in which the types of forms have already been registered are shown at 1300, 1301, 1302, and 1303, respectively. Each dictionary is provided in correspondence to the type of form. Dictionary points 1310, 1311, 1312, and 1313 are provided as position coordinates for the dictionary 1300. Dictionary points 1314, 1315, and 1316 are provided as position coordinates for the dictionary 1301. Dictionary points 1317, 1318, and 1319 are provided as position coordinates for the dictionary 1302. Dictionary points 1320, 1321, and 1322 are provided as position coordinates for the dictionary 1303.

Figure 14:
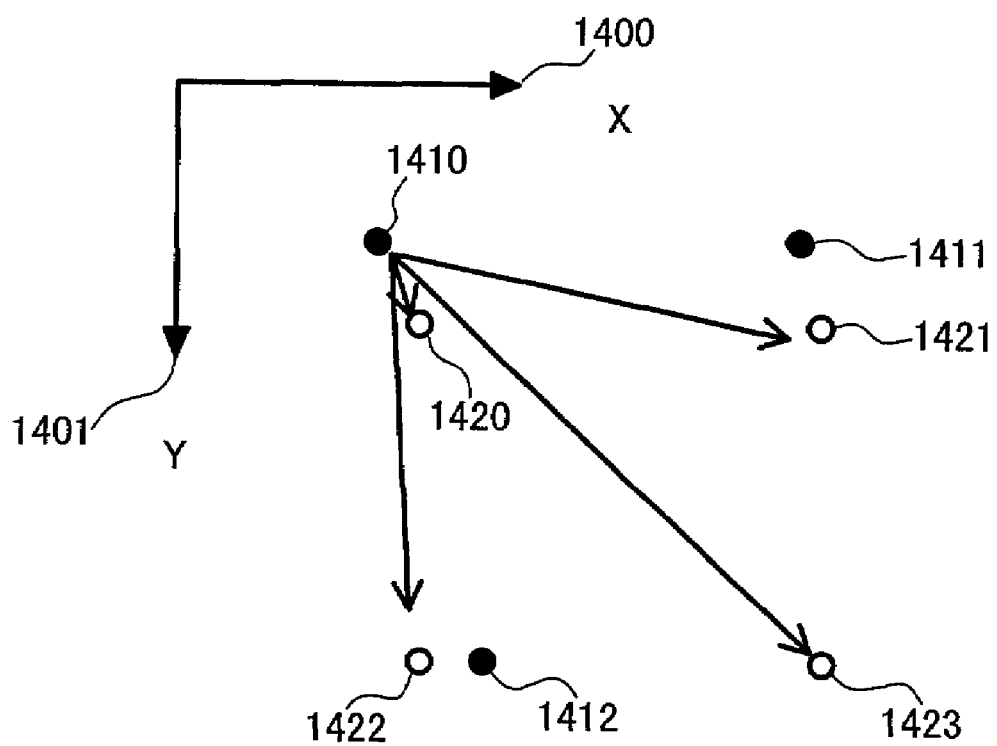
FIG. 14 is a diagram for explaining a method of calculating the minimum distance between an inputted point and a dictionary point in step 903 in FIG. 9.

FIG. 14 is a diagram for explaining the method of calculating the minimum distance between the inputted point and the dictionary point in step 903 in FIG. 9. In FIG. 14, on a form plane of a horizontal direction X shown at 1400 and a vertical direction Y shown at 1401, inputted points (shown by black circles) extracted from the inputted form images are designated by reference numerals 1410, 1411, and 1412. Dictionary points (shown by white circles) of a certain dictionary are designated by reference numerals 1420, 1421, 1422, and 1423.

To obtain dictionary points existing at positions near the point of the shortest distance with respect to the arbitrary inputted point 1410, distances between the inputted point 1410 and the dictionary points 1420, 1421, 1422, and 1423 are calculated, and the dictionary point having the shortest distance, in the example, the dictionary point 1420 is obtained. With respect to each inputted point, a similar process is executed, thereby obtaining the dictionary point existing at the position of the shortest distance. Thus, the point 1421 is extracted as a dictionary point existing at a position of the shortest distance from the inputted point 1411 and the dictionary point 1422 is likewise extracted for the inputted point 1412, respectively. Since the corresponding dictionary point is detected by using the inputted point as a reference, there is not a corresponding inputted point with respect to the dictionary point 1423.

Figure 15:
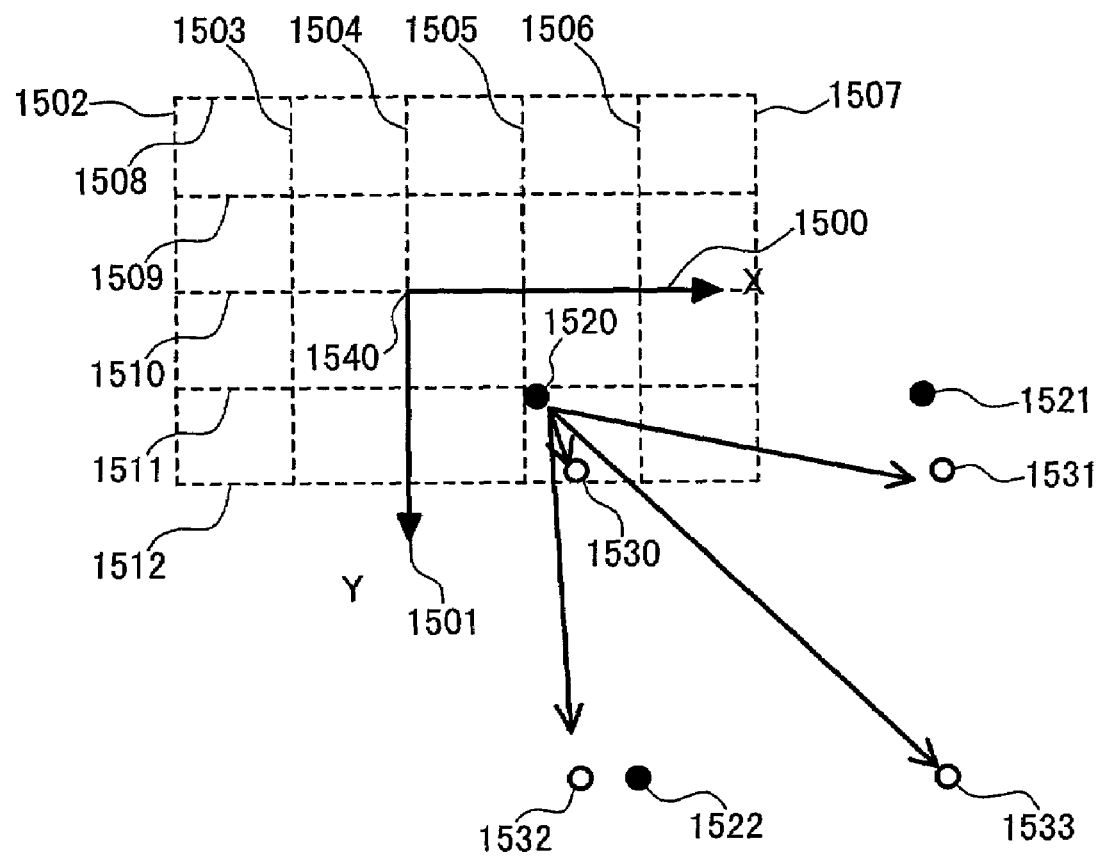
FIG. 15 is a diagram for explaining a point pattern matching in the case where coordinate values are shifted in the X and Y directions as shown in steps 602 and 603 in FIG. 6.

FIG. 15 is a diagram for explaining the point pattern matching in the case where the coordinate values are shifted in the X and Y directions as shown in steps 602 and 603 in FIG. 6. In an inputted form image shown in FIG. 15, a position of an origin in a horizontal direction X shown at 1500 and a vertical direction Y shown at 1501 is designated at 1540. Inputted points extracted from the inputted form image are designated at 1520, 1521, and 1522 and dictionary points of a certain dictionary are designated at 1530, 1531, 1532, and 1533, respectively. Broken lines 1502 to 1507 in the vertical direction show shift locations at the time when the position of the origin is shifted by a predetermined interval in the horizontal direction, and broken lines 1508 to 1512 in the horizontal direction show shift locations at the time when the position of the origin is shifted by a predetermined interval in the vertical direction, respectively.

In FIG. 15, the origin is moved parallel to the cross point of the broken lines mentioned above. That is, the values of the coordinates of the inputted point are updated by a fixed amount. The point pattern matching process in step 604 in FIG. 6 is executed to the coordinates of the inputted point which was moved parallel. According to the embodiment of the invention, since the origin is moved parallel in the horizontal and vertical directions at fixed intervals and the point pattern matching is performed as mentioned above, even if there is a location shift of the inputted form, the form can be identified at high precision.

Figure 16:
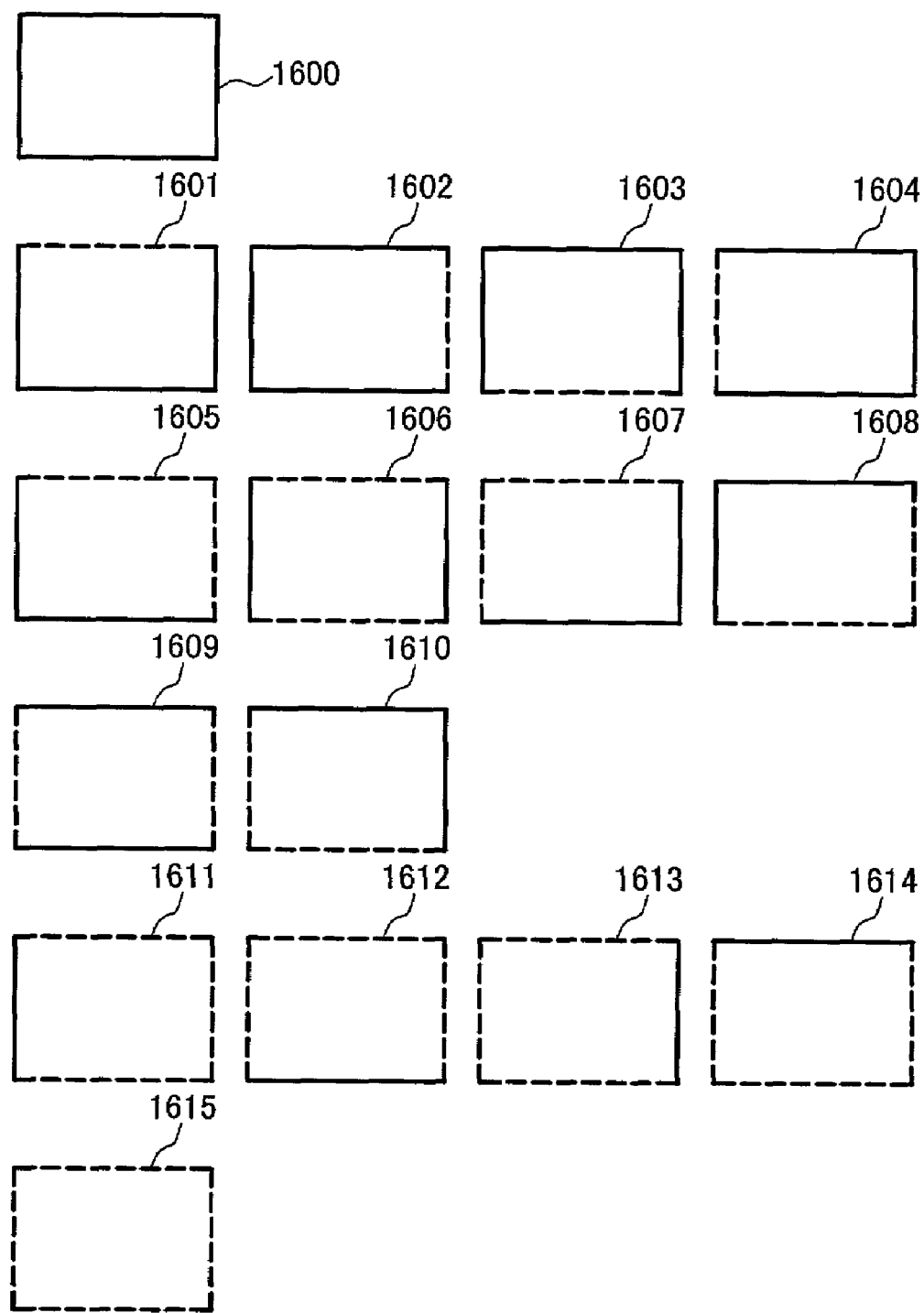
FIG. 16 is a diagram for explaining types of cell lines which are used as features of the cells.

FIG. 16 is a diagram for explaining types of cell lines which are used as features of the cells. In step 1000 of extracting the line segments in the flow of FIG. 10 described mentioned above, not only the solid lines but also, for example, the broken lines can be extracted and used as features of the cells for the form identification. If there are a solid line and a broken line as types of lines constructing the cells, as shown in FIG. 16, as types of cells, there are sixteen types shown as cells 1600 to 1615. The types of cell lines are not necessarily limited to the solid line and broken line. For example, line types such as dash-dot line, broken line (or dashed line), and the like can be also included or a thickness of line can be also included into the line types. If the line types of the cells are different, even if the shapes or positions of the cells are the same, the types of forms are different.

In the embodiment of the invention, attributes are allocated to 16 kinds of cells, respectively. For example, numbers 1 to 16 can be also used as attributes in correspondence to the types of cell lines. For instance, in case of the cell 1600, four cell lines are the solid lines. In case of the cells 1601 to 1604, three cell lines are the solid lines and one remaining cell line is the broken line. In case of the cells 1605 to 1610, two cell lines are the solid lines and two remaining cell lines are the broken lines. In case of the cells 1611 to 1614, three cell lines are the broken lines and one remaining cell line is the solid line. In case of the cell 1615, four cell lines are the broken lines. All of them are the different types of cells. As a process for extracting the broken lines among the lines in step 1000, for example, the broken line extracting method disclosed in JP-A-9-319824 can be used.

Figure 17:
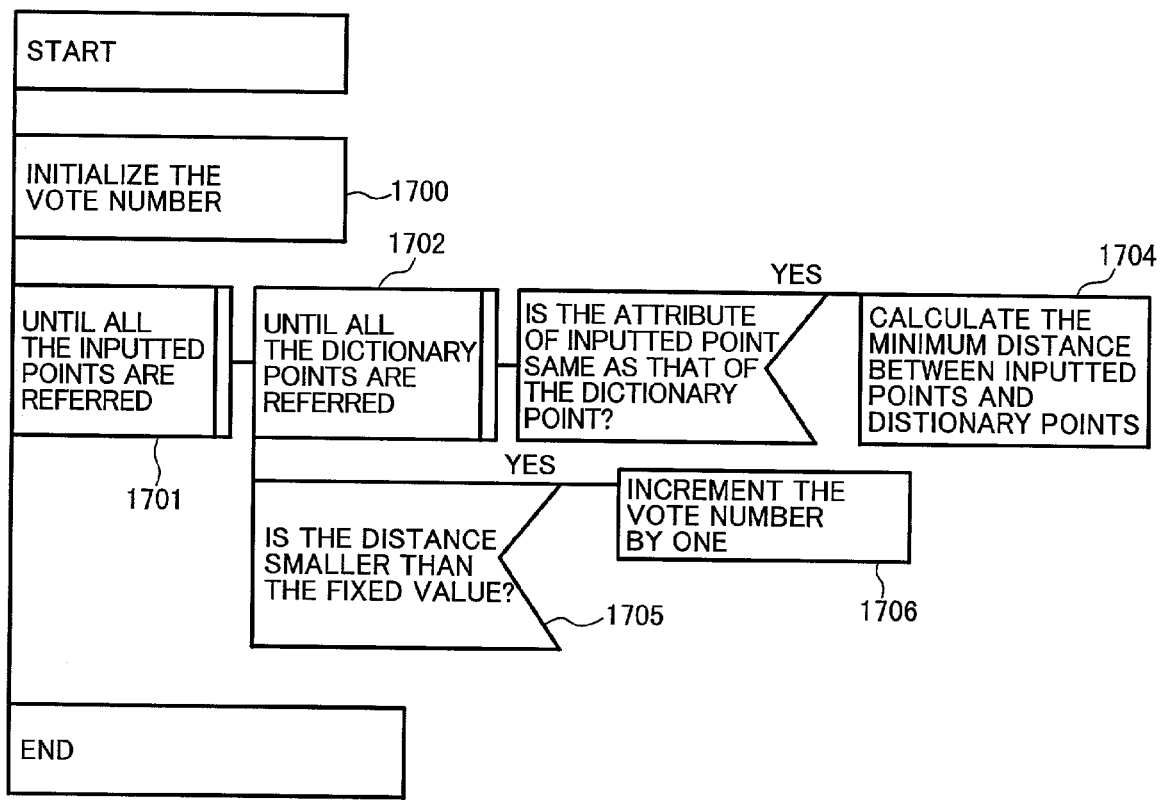
FIG. 17 is a flowchart for explaining the processing operation in case of using an attribute of a point in the vote number detecting process in step 802 in FIG. 8.

FIG. 17 is a flowchart for explaining the processing operation in case of using an attribute of a point in the vote number detecting process in step 802 in FIG. 8. In the process here, the type of cell line is allocated as an attribute of the point. According to the process, among the dictionary points existing near the attention inputted point, the dictionary points whose attributes are the same as that of the inputted point and which exist at positions of the minimum distance are obtained. Whether the dictionary points to be identified exist or not is discriminated on the basis of a length of minimum distance. The number of such inputted points which have the dictionary points is counted as the number of votes.

In FIG. 17, first, the number of votes is initialized in step 1700. In step 1701, a process for repeating the processes in step 1702 and subsequent steps until all the inputted points are referred, is set. Until all the dictionary points are referred in step 1702, the dictionary points in which the attribute of the inputted point coincides with that of the dictionary point are obtained in step 1703. The minimum distance between the inputted point and the dictionary point is calculated in step 1704. Whether the distance is smaller than a fixed value or not is discriminated in step 1705. If it is smaller, the value of the number of votes is increased by "1" in step 1706. By repeating the above processes, the number of votes can be calculated.

By the processes in FIG. 17 mentioned above, with respect to the forms in which the types of cell lines are different, it is possible to determine that the types of forms are different. Thus, for example, in the case where the forms in which the attributes of the cell lines are different can be regarded as the same type of forms, the format data for reading characters can be made common, and an advantage such that the operation to form the format data can be omitted can be obtained. In the form image, there is a case where the broken line is broken due to an influence by the binarization of the image and becomes a solid line in which the broken lines are coupled. With respect to such a form, by ignoring the attributes of the cell lines, the type of form can be identified with high reliability.

FIG. 18 is a diagram for explaining the process for rotating the cell coordinates by 90° in step 500 in FIG. 5. In FIG. 18, a feature extracted from the inputted form image is shown at 1800. The position coordinates of the center of the cell are provided as a feature. A feature obtained by rotating the inputted feature 1800 clockwise by 90° becomes a feature shown at 1801. A feature obtained by vertically reversing the inputted feature 1800 becomes a feature shown at 1802. A feature obtained by rotating the inputted feature 1800 counterclockwise by 90° becomes a feature shown at 1803. In the embodiment of the invention, since the inputted feature is rotated on a 90° unit basis and the verification is made as mentioned above, even if the form is set into the scanner in an arbitrary direction, the form can be identified. As another method different from the method of rotating the inputted point, it is also possible to rotate the dictionary point and make the matching processing.

Figure 19:
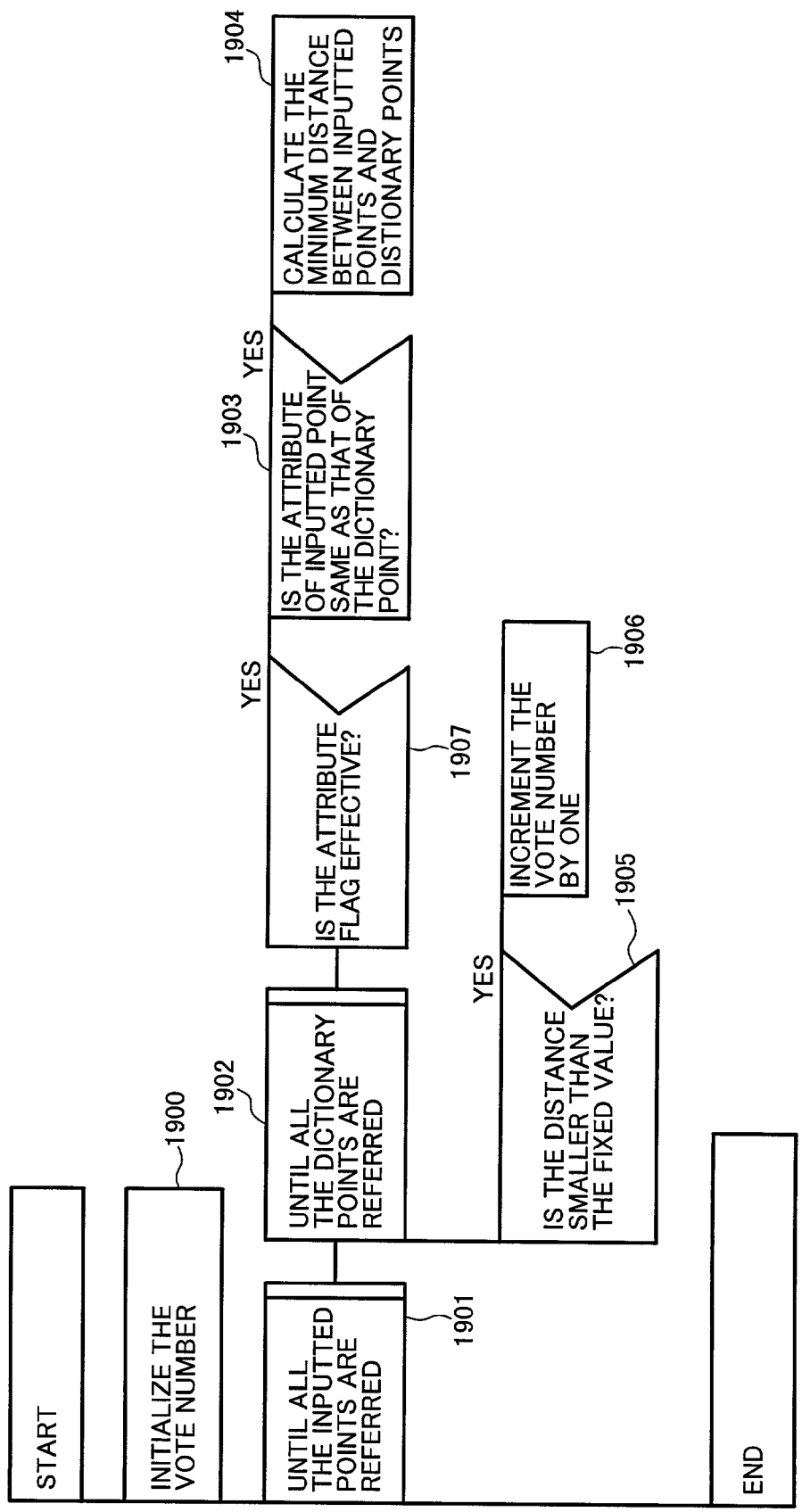
FIG. 19 is a flowchart for explaining the processing operation in case of switching the attribute of the point to either validity or invalidity in the vote number detecting process in step 802 in FIG. 8 and obtaining the number of votes.

FIG. 19 is a flowchart for explaining the processing operation in case of switching the attribute of the point to either validity or invalidity in the vote number detecting process in step 802 in FIG. 8 and obtaining the number of votes and will be explained hereinbelow.

The switching process is executed every type of form. The switching timing of this process is not limited to the timing of every type of form but the switching process can be also executed every cell in the form. Identification control information for validating or invalidating the type of cell line every form which has previously been registered or every cell in the form is provided. For example, it is assumed here that an attribute flag is provided as identification control information and the control mode is switched in accordance with the attribute flag which is used in step 1907. In the example, the type of cell line is allocated as an attribute of the point and it is assumed that a process for identifying in consideration of the line type and a process for identifying by ignoring a difference of the line types are switched. According to the process, among the dictionary points existing near the inputted point of interest, the dictionary points in which the attribute of the inputted point and that of the dictionary point are the same and which exist at positions of the minimum distance are obtained, whether the dictionary points to be subjected to the matching exist or not is discriminated on the basis of the length of minimum distance, and the number of such inputted points which have the dictionary points is counted as the number of votes.

(1) First, the number of votes is initialized and a process for repeating processes in step 1902 and subsequent steps until all the inputted points are referred, is set (step 1901).

(2) Whether the attribute of each cell, for example, the line type is validated or invalidated is determined until all the dictionary points are referred. If the attribute is validated, the dictionary points in which the attribute of the inputted point and that of the dictionary point are the same are obtained and the minimum distance between the inputted point and the dictionary points is calculated (steps 1902, 1907, 1903, and 1904).

If the attribute is invalidated in step 1907 mentioned above, the calculation of the minimum distance in the processes in step 1903 and subsequent steps is not executed here. However, it is not always necessary to limit the invention as mentioned above. For instance, it is also possible to use a method whereby if the attribute flag is invalid in step 1907, even if the attribute of the inputted point and that of the dictionary point are not the same in step 1903, the calculation of the minimum distance is executed in the process in step 1904 and the attributes are ignored.

(3) Whether the minimum distance calculated in step 1904 is smaller than a fixed value or not is discriminated. If it is smaller, the value of the number of votes is increased by "1". By repeating the above processes, the number of votes can be calculated (steps 1905 and 1906).

By the processes shown in FIG. 19 mentioned above, with respect to the forms in which the types of cell lines are different, a discriminating mode is switched to the mode for determining that the types of forms are the same or the mode for determining that the types of forms are different, and the number of votes can be calculated.

FIG. 20 is a diagram for explaining an example of the features of the form images which are used in the form identification. As shown in FIG. 20, there are coordinates of a center 2000 in a cell 2001 in the form, coordinates of a center 2002 of a line 2003 in the form, coordinates of a center 2004 of a rectangle 2005 which is circumscribed about the character line in the form, and the like. Those coordinates can be used as features for use in form identification.

Figure 22:
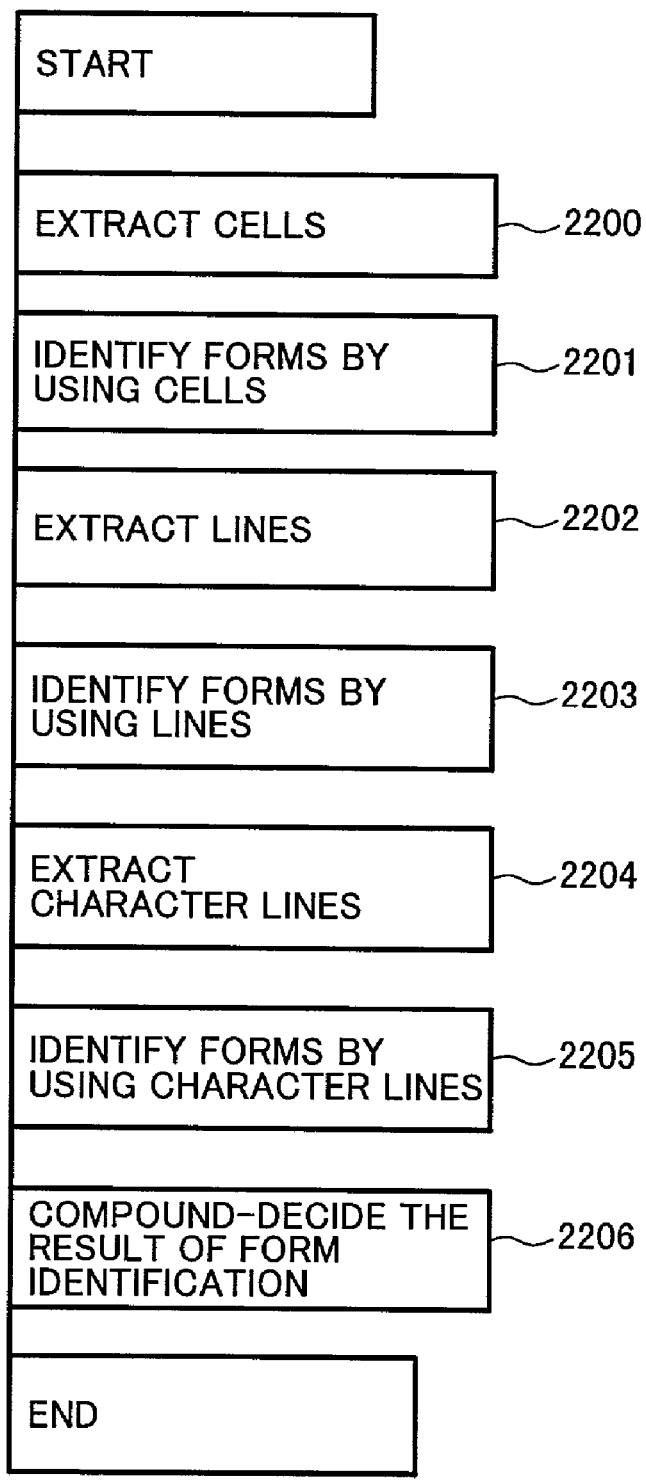
FIG. 22 is a flowchart for explaining an example of the processing operation for identifying the form by using cells, lines, and a character line rectangle as features of the form images.

FIG. 22 is a flowchart for explaining an example of the processing operation for identifying the form by using three kinds of features described in FIG. 20, that is, cells, lines, and a character line rectangle. In FIG. 22, cells are extracted as features of the form in step 2200. The form is identified by using the cells in step 2201. Subsequently, in step 2202, lines are extracted as features of the form. In step 2203, the form is identified by using the lines. Further, in step 2204, character lines are extracted. In step 2205, the form is identified by using the character lines. In step 2206, a compound decision of each form identification result in steps 2201, 2203, and 2205 is made.

Figure 23:
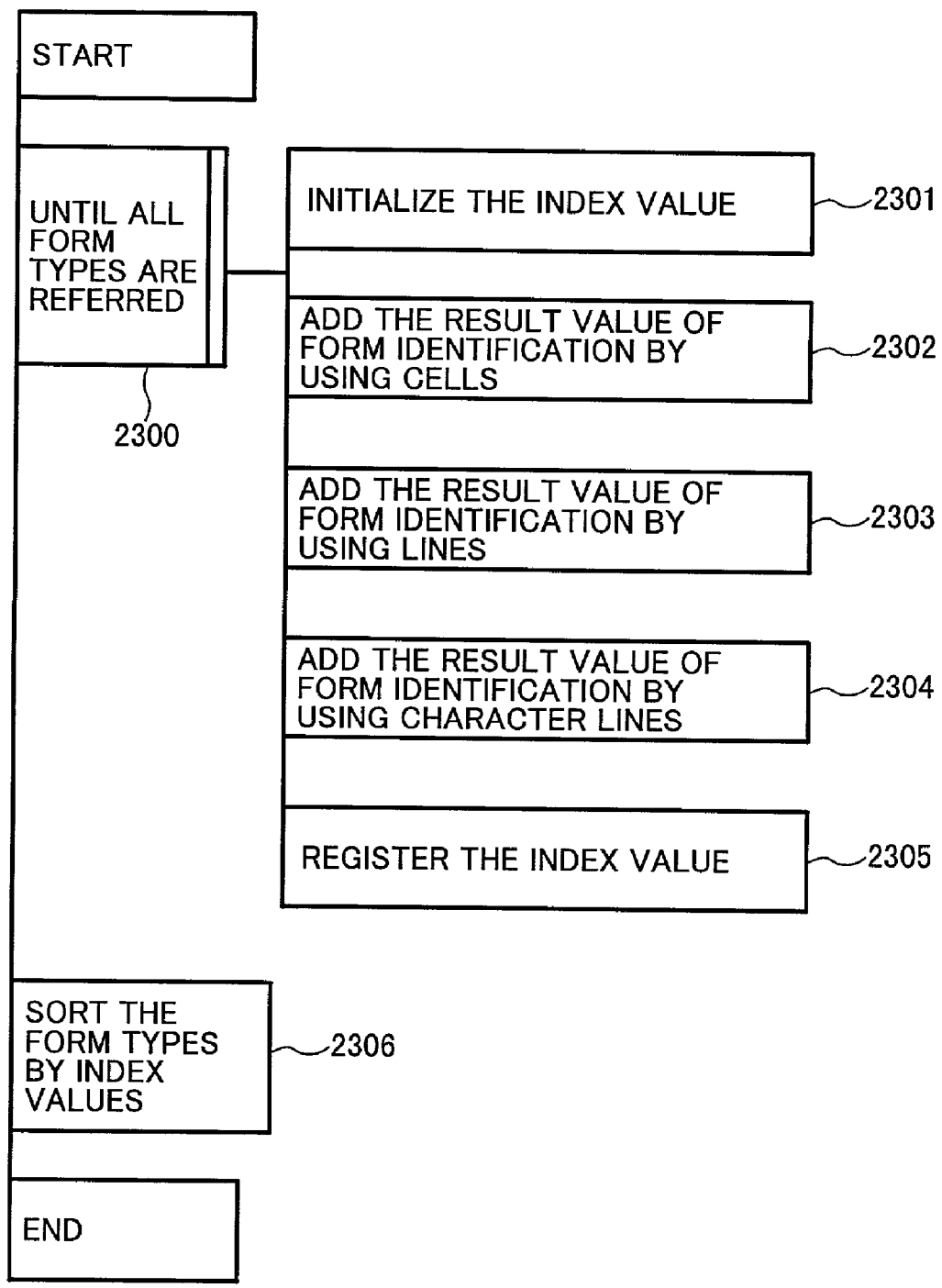
FIG. 23 is a flowchart for explaining the processing operation for compound decision of a form identification result in step 2206 in FIG. 22.

FIG. 23 is a flowchart for explaining the processing operation for the compound decision of the form identification result in step 2206 in FIG. 22 and will be explained hereinbelow.

First, in step 2300, a process for repeating processes in steps 2301 to 2305 until all the form types are referred which have previously been registered, is designated. By the process in step 2301, an index value for the compound decision is initialized every form type, thereby preparing for the next process. Subsequently, by the process in step 2302, a form identification result using the cells is added to the relevant index value, that is, the initial value here. By the process in step 2303, a form identification result using the line cells is added to the index value, that is, the index value of (the initial value+the identification result using the cells) here. Further, by the process in step 2304, a form identification result using the character lines is added to the index value, that is, the index value of (the initial value+the identification result using the cells+the identification result using the character lines) here. Subsequently, by the process in step 2305, the index value of (the initial value+the identification result using the cells+the identification result using the lines+the identification result using the character lines) obtained in step 2304 is registered. Finally, by the process in step 2306, the form types as identification results are sorted in order of the magnitudes of the index values.

In case of using the order of the form identification candidates as an index value in the above description, the form types are sorted in order from the small index value, or in case of using the similarity values of the form identification candidates as an index value, the form types are sorted in order from the large index value. According to the embodiment of the invention, since the form identification results can be outputted by using the features of a plurality of forms as mentioned above, the form can be identified at high precision. For example, a form such that the cells and bottom lines exist mixedly can be identified at high precision.

Figure 24:
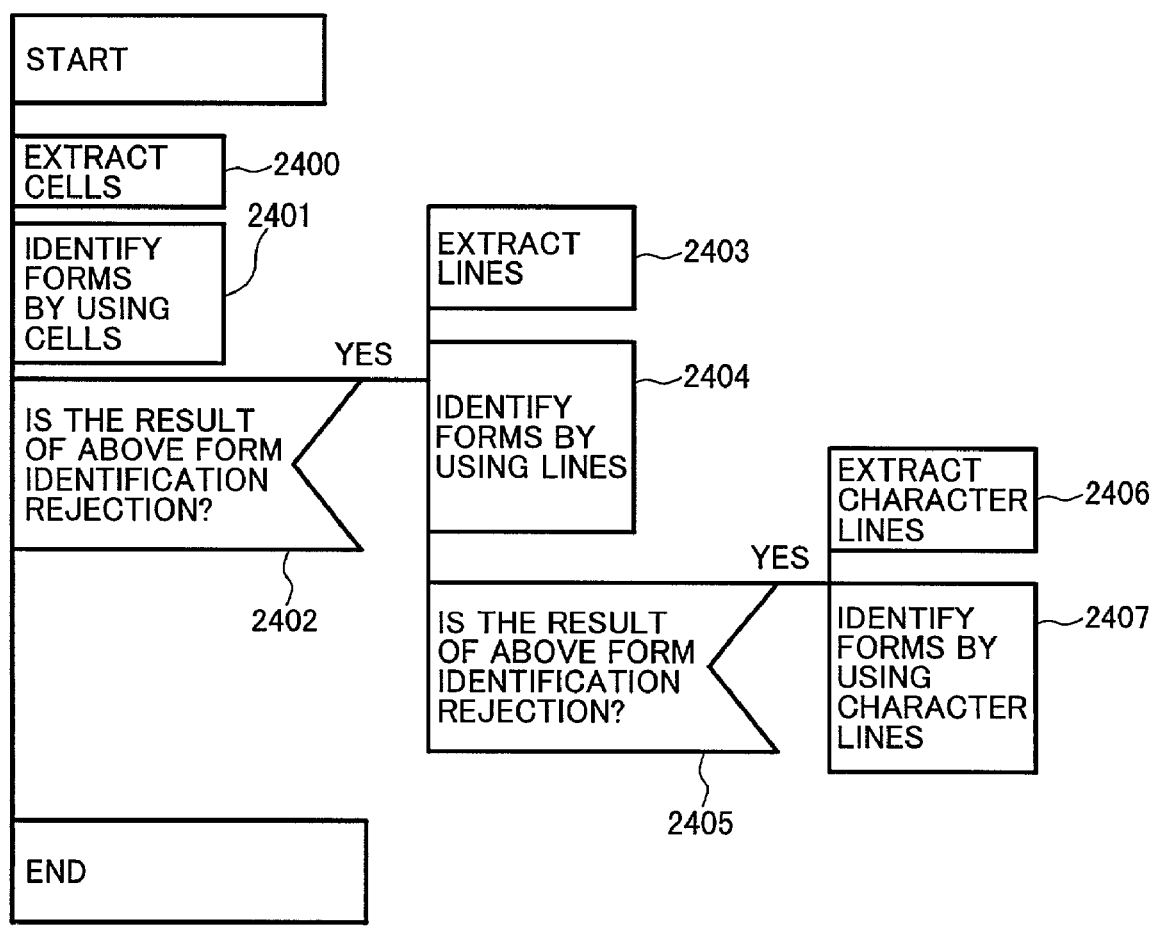
FIG. 24 is a flowchart for explaining another example of the processing operation for form identification using features of three types of forms.

FIG. 24 is a flowchart for explaining another example of the processing operation for form identification using the features of three types of forms and shows an example according to another method different from the method based on the flow described in FIG. 23.

In FIG. 24, first, the cells are extracted in step 2400. The forms are identified by using the cells in step 2401. Whether the form identification using the cells is rejected or not is discriminated in step 2402. If it is rejected, the lines are extracted in step 2403. The forms are identified by using the lines in step 2404. Whether the form identification using the lines is rejected or not is discriminated in step 2405. If it is rejected, the character lines are extracted in step 2406. The forms are identified by using the character lines in step 2407.

According to the processes shown in FIG. 24, if the form identification using a certain feature is rejected, since the form identification using another feature is made, the processing time can be shortened.

FIG. 26 is a block diagram showing an example of a construction of a system in which a processing center and branches and offices at remote locations are connected to the network and a form identification is made. In FIG. 26, reference numeral 2600 denotes a network; 2601 a center station; 2602 a form registration station; 2603 and 2614 form edit stations; 2610 to 2612 branch stations; and 2613 a form identification station.

The system shown in FIG. 26 is constructed in a manner such that the center stations 2601 existing at a few locations in the whole country and the branch stations 2610 to 2612 provided in the branches and offices existing at remote locations are connected to the network 2600. The form registration station 2602 for registering forms and the form edit station 2603 for editing forms are provided for the center station 2601. The form identification station 2613 for inputting and identifying form images and the form edit station 2614 for enabling forms to be edited in the branches are provided for each of the branch stations 2610 to 2612. In the system constructed as mentioned above, since a dictionary for form identification and form files for printing are distributed from the center station 2601 to the branch stations 2610 to 2612 via the network 2600, maintenance of the dictionary and the like can be managed in a lump and the maintenance operation can be lightened.

Figure 21:
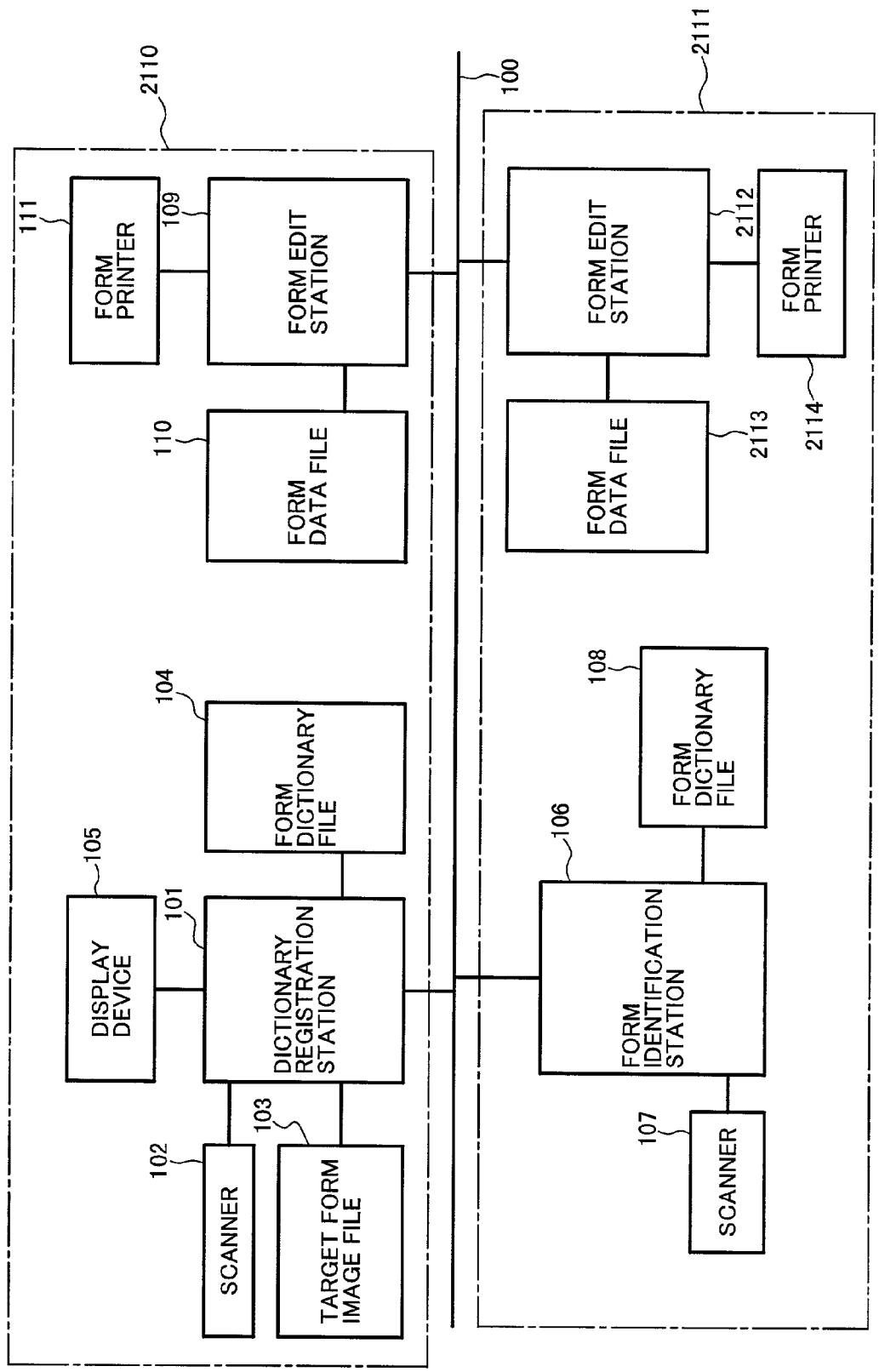
FIG. 21 is a block diagram showing an example of a construction of a form image identification system according to another embodiment of the invention.

FIG. 21 is a block diagram showing an example of a construction of a form image identification system according to another embodiment of the invention. In FIG. 21, reference numeral 2110 denotes a center station; 2111 a remote station; 2112 a form edit station; 2113 a form data file; and 2114 a form printer. The other component elements are substantially the same as those designated by the same reference numerals in FIG. 1.

The form image identification system according to another embodiment of the invention shown in FIG. 21 is constructed in a manner such that the dictionary registration station 101, form identification station 106, and form edit stations 109 and 2112 are connected via the communication network 100, and those stations can operate in an interlocking relational manner. The dictionary registration station 101 and form edit station 109 are constructed as a center station 2110 surrounded by a dash-dot line. The form identification station 106 and form edit station 2112 are constructed as a remote station 2111 provided for each office existing at a remote place surrounded by a dash-dot line.

The dictionary registration station 101 previously registers the features of the form images in order to identify the types of forms. The dictionary registration station 101 comprises: the scanner 102 for collecting the form images; registration target form image file 103 for storing the form images serving as registration targets; and form dictionary file 104 for storing the features of the registered form images. The dictionary registration station 101 has the display device 105. The registered form images and new form images collected by the scanner are displayed on the screen of the display device 105, thereby performing the registering operation in an interactive manner.

The form identification station 106 identifies the types of form images inputted from the scanner 107 by using the form dictionary file 108 for storing the features of the registered form images. Contents of the form dictionary file 108 are the contents obtained by copying the form dictionary file 104 on the dictionary registration station 101 side and can be always updated to the latest data through the communication network. As a form dictionary file which is used for form identification, it is also possible to use the file obtained by accessing the form dictionary file 104 on the dictionary registration station side through the communication network.

The form edit station 109 is equipped with the form data file 110 and form printer 111 and prints the form onto the paper by using the form printer 111 with respect to the form data stored in the form data file 110. The form edit station 109 edits the form data so as to make the form identification easy and prints the form images. In the dictionary registration station 101, the printed form images are collected by the scanner 102 and the operation to newly register them can be tried.

The form edit station 2112 is provided for the remote station as an office side and the form data file 2113 and form printer 2114 are connected thereto. The forms stored in the form data file 2113 are printed on the office side by the form printer 2114 and distributed therefrom. At this time, if the form dictionary file 108 is updated and the latest dictionary file is not stored, matching between the form dictionary file 108 and the form data file 2113 is lost and there is a fear that the form identification is rejected with respect to the forms which were printed and distributed as mentioned above. It is, therefore, necessary to verify the matching between the form dictionary file 108 and the form data file 2113.

Figure 25:
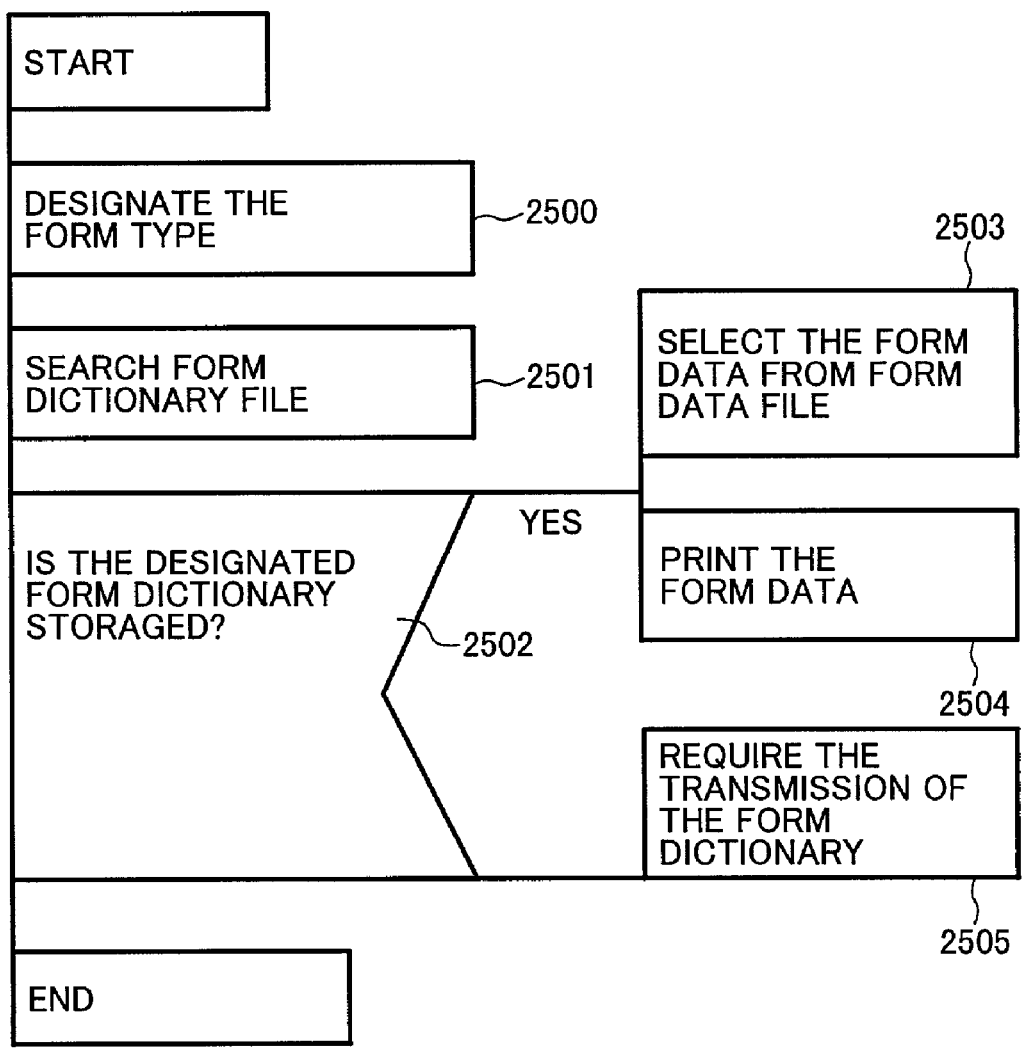
FIG. 25 is a flowchart for explaining the processing operation for detecting a pattern matching between a form dictionary file 108 and a form data file 2113.

FIG. 25 is a flowchart for explaining the processing operation for detecting the matching between the form dictionary file 108 and the form data file 2113.

In the flow shown in FIG. 25, first, the form edit station 2112 designates the type of form as a print target in step 2500. The form dictionary file 108 is searched in step 2501. Whether the designated form dictionary has been stored or not is discriminated in step 2502. If the form dictionary has been stored, the corresponding form data is selected from the form data file 2113 in step 2503. The form data is printed in step 2504. If it is determined in step 2502 that the form dictionary is not stored, a request for transmission of the form dictionary is sent to the dictionary registration station 101 existing on the center side in step 2505 and the form dictionary file 108 is updated. Thus, it is possible to guarantee that the dictionary for form identification corresponding to the printed form has been stored.

According to the invention as mentioned above, there is disclosed the form registration method of previously registering features of forms for the purpose of the form identification to identify the types of forms by verifying the features of a plurality of forms which have previously been registered with the features of the inputted forms, characterized in that the inputted form images serving as registration targets and the registered form images which were determined to be similar by the form identification are displayed on the screen, the decision information of the user about whether the inputted forms have already been registered or not is inputted, and in order to register the target forms as new forms, the data of the target forms is edited and printed and a retry to register them is executed. The form identification method whereby the features of a plurality of forms which have previously been registered are verified to determine matching with the features of the inputted forms on the basis of the position coordinates, thereby identifying the types of forms is also disclosed. The following form identification methods are disclosed. For example, there is disclosed the form identification method whereby each position extracted as an input feature of the inputted form is verified to determine the matching with the reference position while moving the position parallel in the horizontal and vertical directions at the fixed width from the reference position of the registered feature of the forms which has previously been registered, the parallel moving position where the position most coincides with the registered feature is set to the position of the inputted form, and the form type having the most coincident registered feature is set to the form identification result. There is also disclosed the form identification method whereby the inputted points at which the point coordinates have been allocated to the features of the inputted forms and the dictionary points at which the point coordinates have been allocated to the features of the registered forms are provided, the distance between the inputted point and the dictionary point is calculated, if the distance is equal to or smaller than the fixed value, it is determined that the dictionary point corresponding to the inputted point exists, the feature of the inputted form and the feature of the registered form are verified on the basis of the number of points which were made to correspond, the number of inputted points, and the number of dictionary points, and a degree of coincidence of the verification is obtained, thereby identifying the type of inputted form.

As described above, according to the invention, since the skew of the coordinates of the center of the cell is modified (or corrected) on the basis of the inclination angle of the form detected from the inclination of the cell line or the inclination of the form edges, the form can be identified at high precision even with respect to the form having the inclination. According to the invention, since a plurality of ratios of scaling (or magnifying and shrinking) are presumed and the enlargement and shrinkage (or scale-up and scale-down) of the coordinates of the inputted points are performed, an effect such that even if the forms in which the dropout of features or the generation of false lines occurs have been enlarged and shrunk, the similarity can be calculated can be obtained.

Further, according to the invention, since the origin is moved parallel in the horizontal and vertical directions at a predetermined interval and the pattern matching of the points is performed, even if the inputted form has a location shift, the form can be identified at high precision. According to the invention, with respect to the forms in which the types of cell lines are different, since the validity and invalidity of the types of cell lines are switched every form or every cell in the form and the types of forms can be identified, effects such that the reliability of the form identification can be improved and the storage capacity can be reduced can be obtained.

Further, according to the invention, since the center of the cell is rotated on a 90° unit basis as an inputted feature and the verification is made, even if the form has been set in an arbitrary direction to the scanner, the form can be identified. The form can be identified with higher reliability than that in the form identification using the distribution feature of the lines.

It will be further understood by those skilled in the art that the foregoing description has been made on embodiments of the invention and that various changes and modifications may be made in the invention without departing from the spirit of the invention and scope of the appended claims.

What is claimed is:

1. A form identification method of identifying types of forms, comprising the steps of:

extracting one or a plurality of cells, lines, or character lines included in an inputted form from the inputted form;

extracting one or a plurality of coordinates, as one or a plurality of inputted features, of a center of each of the cells, lines, or character lines as said one or a plurality of features of the form;

rotating either said one or a plurality of inputted features or a registered feature of a form which has previously been registered on a 90° unit basis;

correcting said one or a plurality of inputted features by a micro angle on the basis of a micro inclination angle detected from the cells, lines or character lines;

checking a matching of the one or a plurality of inputted features with the registered feature;

setting the angle at which said one or a plurality of inputted features most coincides with said registered feature to a direction of the inputted form; and setting the type of form having the most coincident registered feature to a form identification result.

2. A method according to claim 1, wherein the direction of the inputted form having said most coincident angle is outputted.

* * * * *